US010972623B2

(12) United States Patent
Mizuno

(10) Patent No.: US 10,972,623 B2
(45) Date of Patent: Apr. 6, 2021

(54) INFORMATION PROCESSING APPARATUS HAVING IMPORT FUNCTION TO IMPORT INFORMATION REGARDING USER SO THAT REGISTRATION UPPER LIMIT IS NOT EXCEEDED BASED ON USER'S LAST LOGIN DATE AND CONTROL METHOD FOR THE SAME, AND STORAGE MEDIUM

(71) Applicant: CANON KABUSHIKI KAISHA, Tokyo (JP)

(72) Inventor: Takafumi Mizuno, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/705,019

(22) Filed: Dec. 5, 2019

(65) Prior Publication Data
US 2020/0195792 A1    Jun. 18, 2020

(30) Foreign Application Priority Data
Dec. 14, 2018   (JP) .............................. JP2018-234103

(51) Int. Cl.
*H04N 1/00*    (2006.01)
*H04N 1/21*    (2006.01)

(52) U.S. Cl.
CPC ....... *H04N 1/0097* (2013.01); *H04N 1/00832* (2013.01); *H04N 1/00962* (2013.01); *H04N 1/21* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2015/0264199 A1* | 9/2015 | Mizuno | ............... | H04N 1/4406 358/1.16 |
| 2019/0278537 A1* | 9/2019 | Fujii | .................... | G06F 3/1204 |

FOREIGN PATENT DOCUMENTS

JP          2015-174317 A       10/2015

* cited by examiner

*Primary Examiner* — Andrew H Lam
(74) *Attorney, Agent, or Firm* — Canon U.S.A., Inc. I.P. Division

(57) ABSTRACT

A method for importing information regarding a user into an information processing apparatus, the information processing apparatus comprising storage that stores personal setting information corresponding to a user that uses the information processing apparatus, and last login time and date of a user that uses the information processing apparatus, includes receiving an import instruction of data including at least one piece of user information, and personal setting information associated with the user information, and identifying, when executing import processing based on the data in response to the import instruction, a user whose personal setting information is to be deleted, based on last login time and date stored in the storage, and deleting personal setting information stored in the storage in association with the identified user so that the personal setting information does not reach a registration upper limit after import.

13 Claims, 27 Drawing Sheets

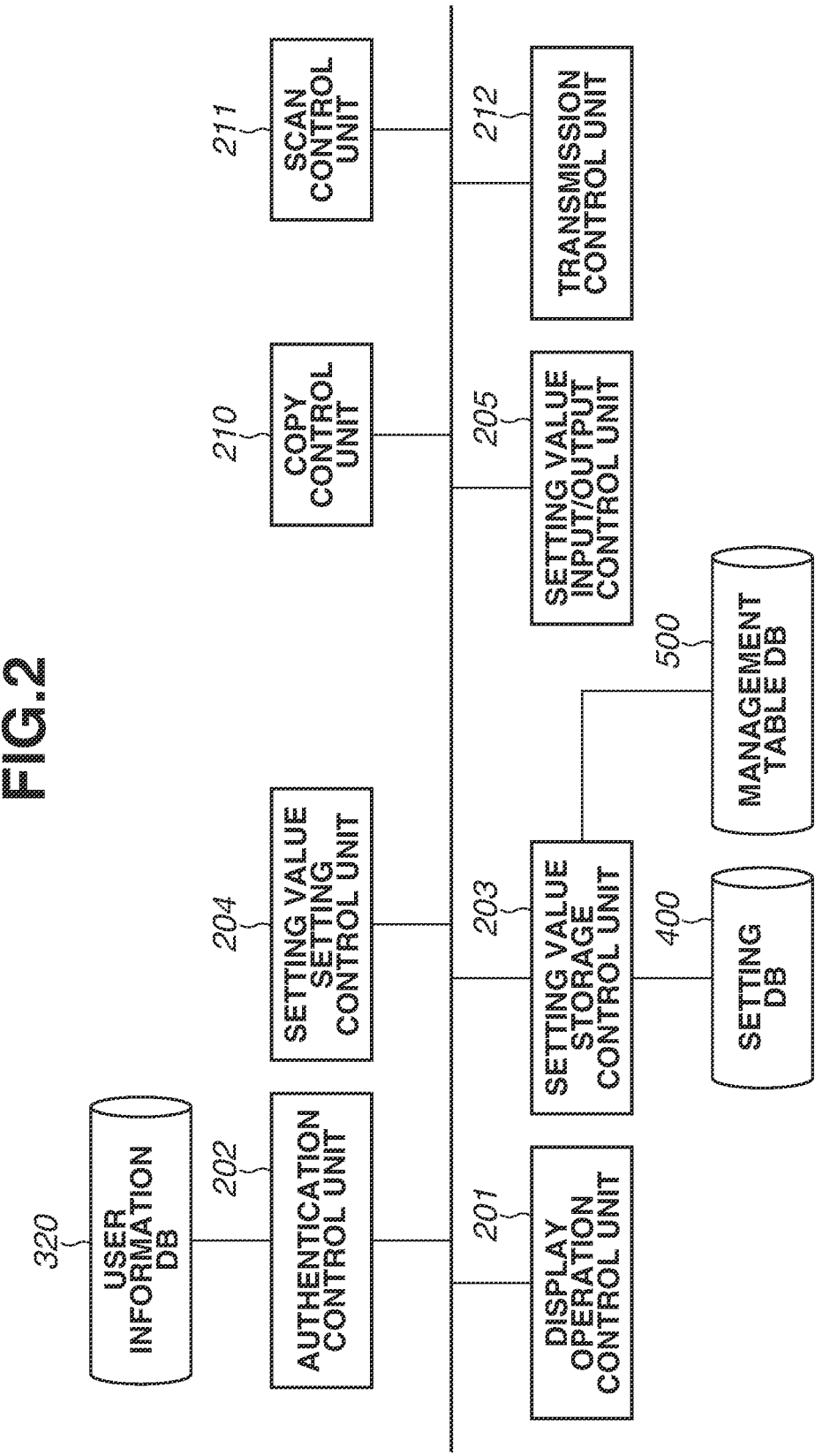

FIG.3A

PERSONAL SETTING EXPORT

- ☑ UserA ~301
- ☑ UserB
- ☑ UserC
- ☐ UserD
- ☐ UserE 302 points to the checkbox.

[SELECT ALL USERS] [CLEAR SELECTION] [EXECUTE EXPORT]

PERSONAL SETTING IMPORT

FILE PATH

[_____] ~311

[EXECUTE IMPORT] ~312

PERSONAL SETTING MIGRATION DATA

| USER IDENTIFIER | USED SIZE | LAST USAGE TIME AND DATE | PERSONAL SETTING VALUE ARCHIVE FILE |
|---|---|---|---|
| UserA | 2 MB | 2018/5/4 10:21 | UserA.tar |
| UserB | 1 MB | 2018/6/2 17:49 | UserB.tar |
| UserC | 2 MB | 2018/5/24 15:03 | UserC.tar |

UPPER LIMIT MANAGEMENT TABLE
701

| MAXIMUM NUMBER OF USERS | 10 |
|---|---|
| MAXIMUM STORAGE CAPACITY | 10 MB |

USER INFORMATION TABLE

| USER IDENTIFIER (711) | USED SIZE (712) | LAST USAGE TIME AND DATE (713) |
|---|---|---|
| UserA | 2 MB | 2018/5/4 10:21 |
| UserB | 1 MB | 2018/6/2 17:49 |
| UserC | 2 MB | 2018/5/24 15:03 |
| UserD | 2 MB | 2018/6/1 12:24 |
| UserE | 1 MB | 2018/5/18 13:08 |

SETTING INFORMATION MANAGEMENT TABLE
721

| NUMBER OF USERS WITH REGISTERED PERSONAL SETTING | 5 |
|---|---|
| USED STORAGE CAPACITY | 8 MB |

USER INFORMATION TABLE OF MFP 102  *801*

| USER IDENTIFIER | USED SIZE | LAST USAGE TIME AND DATE |
|---|---|---|
| User1 | 2 MB | 2018/5/19 14:39 |
| User2 | 2 MB | 2017/6/8 22:58 |
| User3 | 0.5 MB | 2017/10/24 07:05 |
| User4 | 0.5 MB | 2016/8/10 12:30 |
| User5 | 0.5 MB | 2017/1/6 19:11 |
| UserB | 2 MB | 2018/4/14 08:57 |
| UserX | 1 MB | 2017/6/10 20:19 |
| UserY | 0.25 MB | 2016/4/15 13:23 |
| UserZ | 1 MB | 2018/4/30 11:45 |

SETTING INFORMATION MANAGEMENT TABLE OF MFP 102

| NUMBER OF USERS WITH REGISTERED PERSONAL SETTING | 9 |
|---|---|
| USED STORAGE CAPACITY | 9.75 MB |

*810*

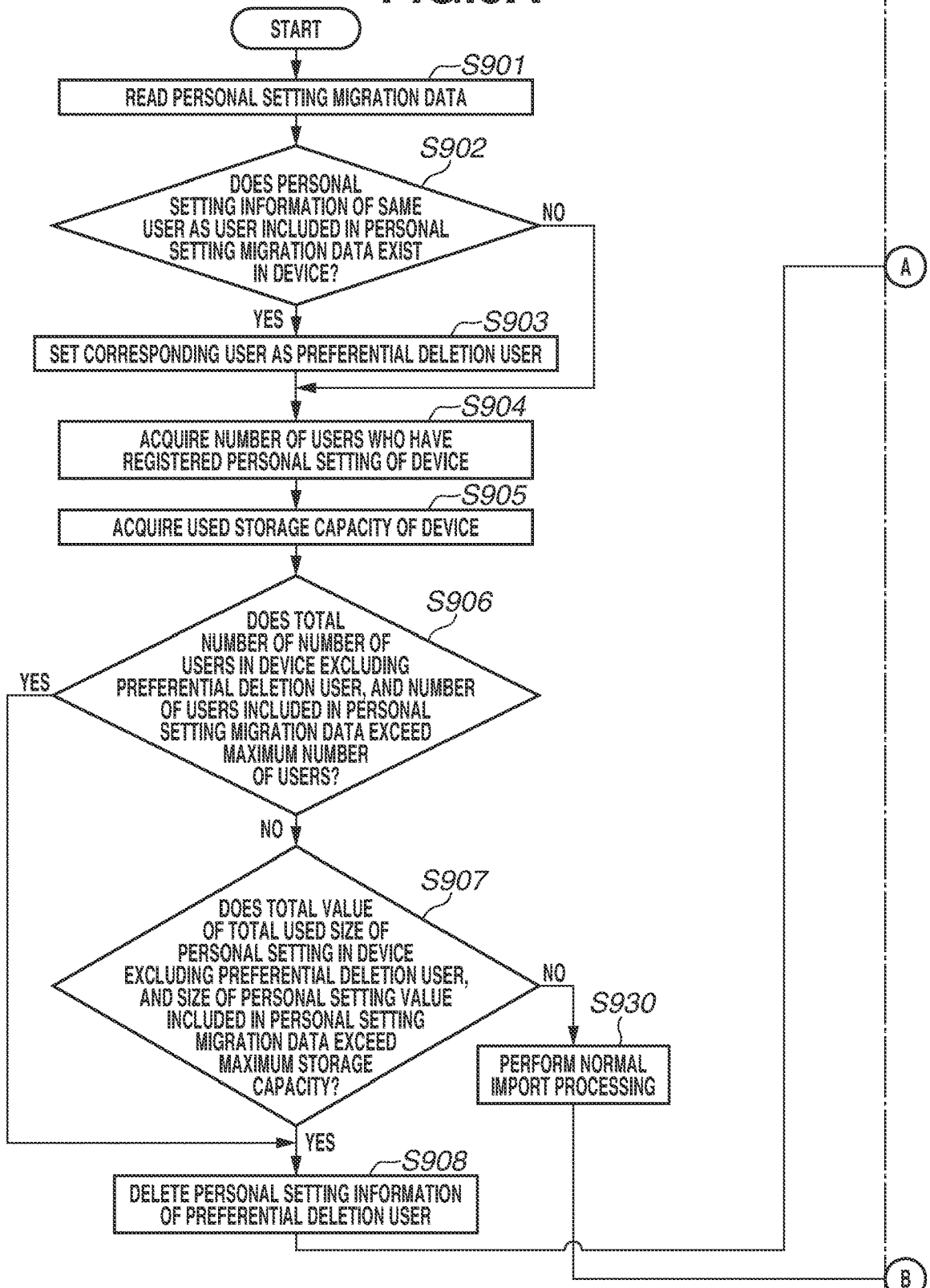

FIG.11A

PERSONAL SETTING INCLUDED IN DESIGNATED FILE CANNOT BE IMPORTED BECAUSE NUMBER OF USERS AND/OR STORAGE SIZE EXCEED(S) MAXIMUM NUMBER OF USERS AND/OR MAXIMUM STORAGE SIZE IF THE PERSONAL SETTING IS IMPORTED.

AUTOMATICALLY DELETE PERSONAL SETTING OF OLD USER IN IMPORT?

YES   NO

FIG.11B

FOR IMPORTING PERSONAL SETTING, DELETE PERSONAL SETTING OF UNNECESSARY USER AND EXECUTE IMPORT AGAIN.

OK

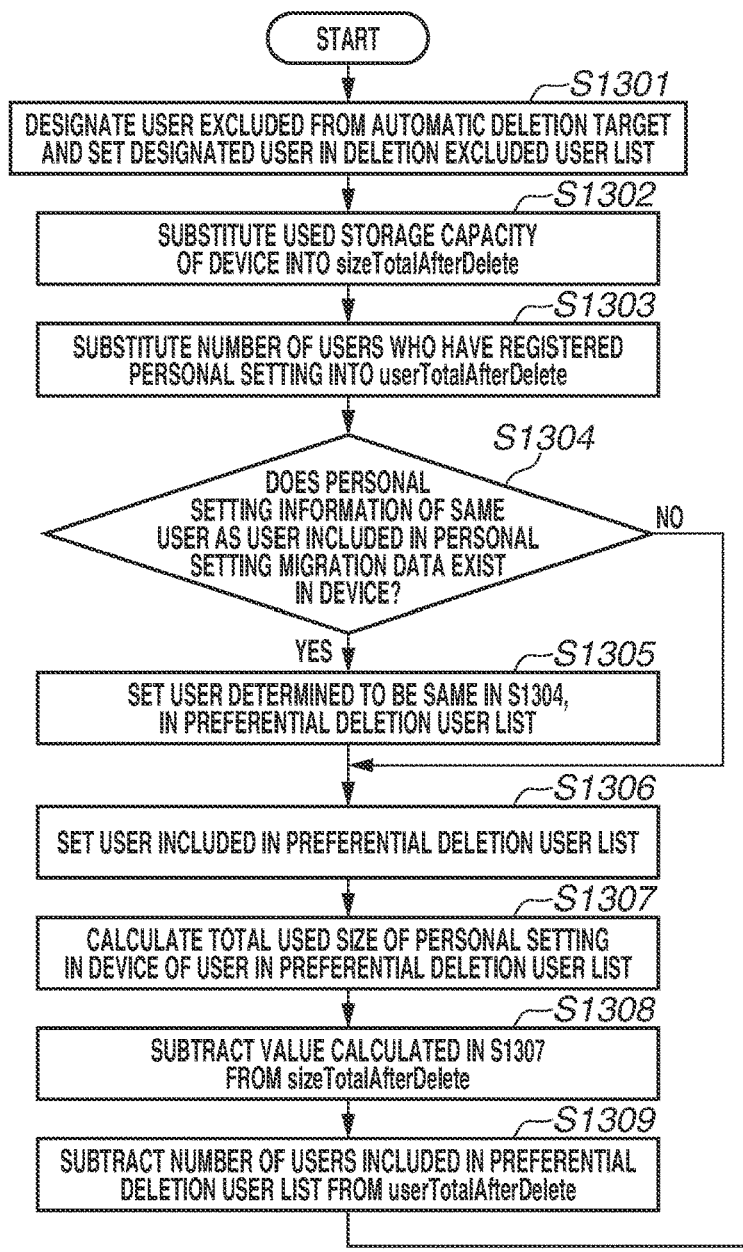

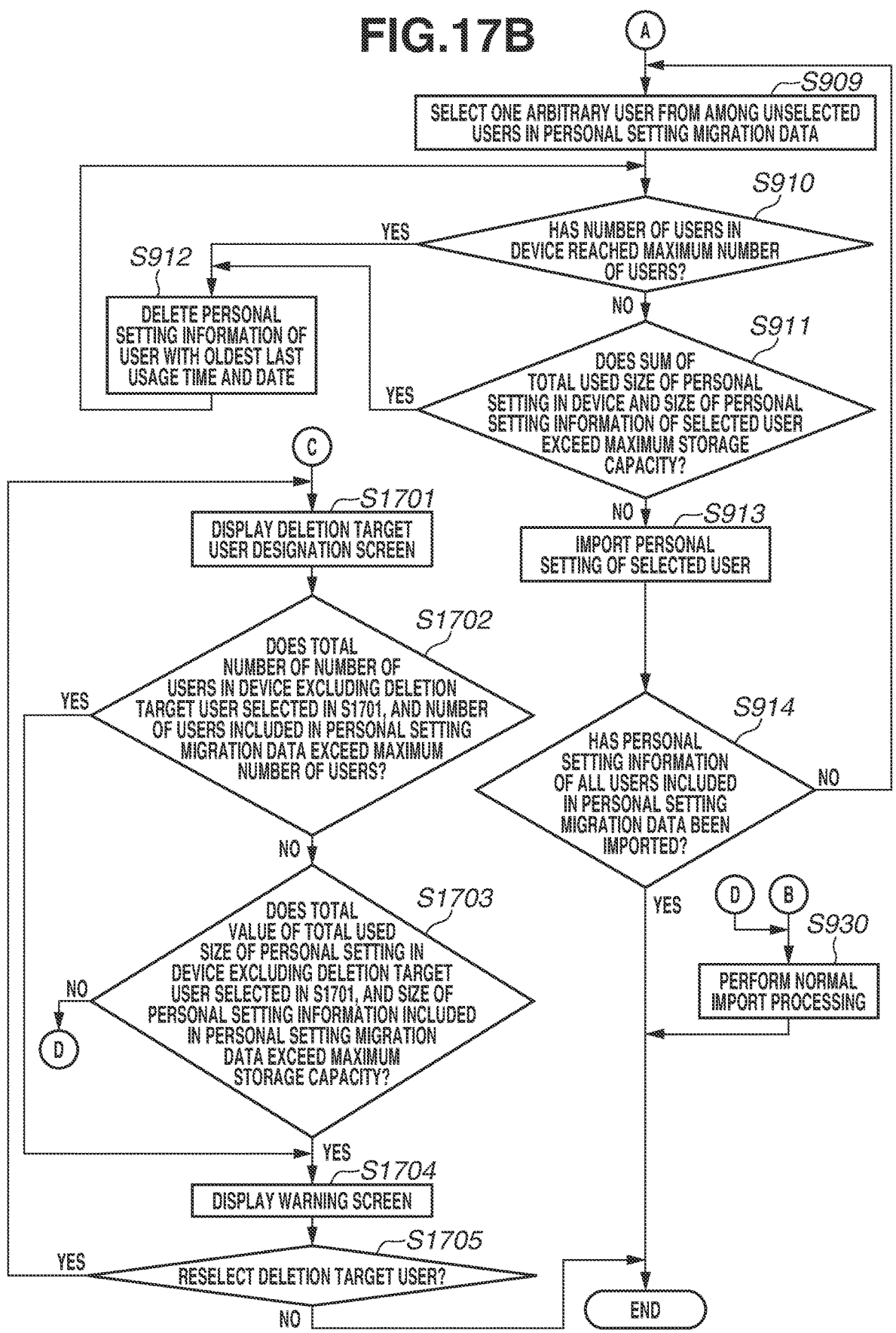

FIG. 19A

DESIGNATION OF DELETION TARGET USER ~1901

☐ User1
☐ User2
☐ User3
☑ User4
☑ User5
☐ UserB
☐ UserX
☐ UserY
☑ UserZ — 1904

[CLEAR SELECTION] — 1903
[CANCEL] [DETERMINE] — 1905

? PERSONAL SETTING OF DESIGNATED USER CANNOT BE IMPORTED BECAUSE NUMBER OF USERS AND/OR STORAGE SIZE EXCEED(S) MAXIMUM NUMBER OF USERS AND/OR MAXIMUM STORAGE SIZE IF THE PERSONAL SETTING IS IMPORTED.

RESELECT USER WHOSE PERSONAL INFORMATION IS TO BE IMPORTED?

[YES] [NO]

FIG. 19C

SELECT IMPORT USER

☑ UserA ~1911
☐ UserB
☑ UserC

[SELECT ALL USERS] [CLEAR SELECTION] [EXECUTE IMPORT]
1913           1914              1915

? PERSONAL SETTING CANNOT BE IMPORTED BECAUSE NUMBER OF USERS AND/OR STORAGE SIZE EXCEED(S) MAXIMUM NUMBER OF USERS AND/OR MAXIMUM STORAGE SIZE DUE TO THE IMPORT EVEN IF PERSONAL SETTING OF DESIGNATED USER IS DELETED.

RESELECT USER WHOSE PERSONAL INFORMATION IS TO BE DELETED?

[YES] [NO]

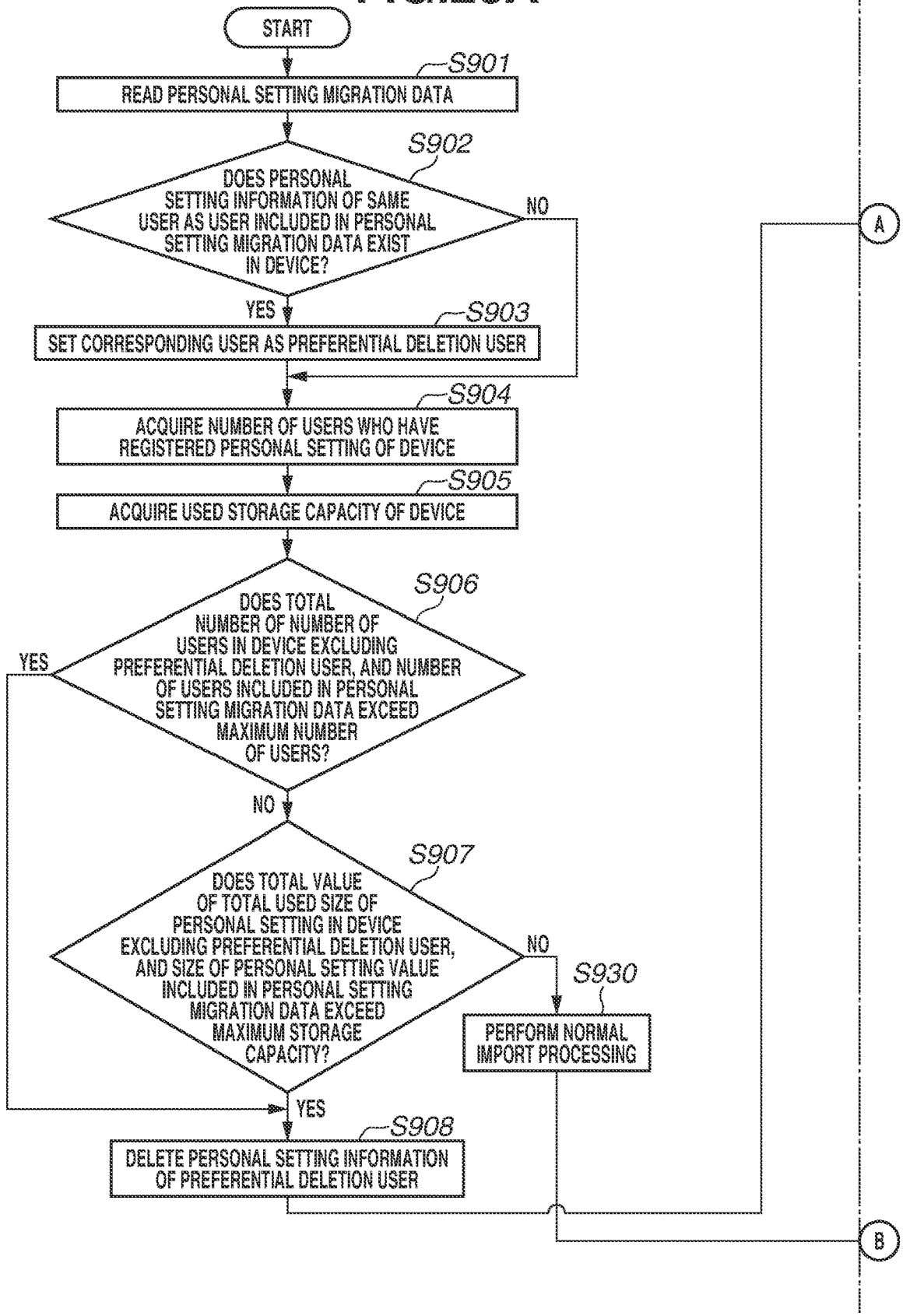

INFORMATION PROCESSING APPARATUS HAVING IMPORT FUNCTION TO IMPORT INFORMATION REGARDING USER SO THAT REGISTRATION UPPER LIMIT IS NOT EXCEEDED BASED ON USER'S LAST LOGIN DATE AND CONTROL METHOD FOR THE SAME, AND STORAGE MEDIUM

BACKGROUND

Field of the Disclosure

The present disclosure relates to an information processing apparatus having a function of importing information and a control method for the same, and a storage medium.

Description of the Related Art

In these days, image forming apparatuses become multifunctional, and operations performed by users have been getting more and more complicated. In general, an image forming apparatus is often shared by a plurality of users. For facilitating the shared use, there is a product equipped with a "personalized function" of registering usually-used setting items for each user and automatically reflecting the registered setting items when the corresponding user logs into the image forming apparatus.

For example, as default values of job settings of a copy function, while a user A registers "1 on 1" as a layout setting and "no finishing" as a finishing setting, another user B registers "2 on 1" as a layout setting and "upper right stapling" as a finishing setting. Then, when the user A logs into an image forming apparatus and uses the copy function, the layout setting "1 on 1" and the finishing setting "no finishing" are displayed as default values. On the other hand, when the user B logs into the image forming apparatus and uses the copy function, the layout setting "2 on 1" and the finishing setting "upper right stapling" are displayed as default values. In this manner, personal setting information of each user is stored in the image forming apparatus for providing an environment access-friendly for an individual user.

On the other hand, because resources of the storage capacity of the image forming apparatus are limited, it is necessary to delete a setting value of a user that is no longer used. Japanese Patent Application Laid-Open No. 2015-174317 discusses a technique of deleting unnecessary data.

SUMMARY

According to an aspect of the present disclosure, an information processing apparatus includes storage that stores personal setting information corresponding to a user who uses the information processing apparatus, and last login time and date of a user who uses the information processing apparatus, at least one memory that stores a set of instructions, and at least one processor that executes the set of instructions, the set of instructions, when executed, causing the information processing apparatus to perform operations including receiving an import instruction of data including at least one piece of user information, and personal setting information associated with the user information, and identifying, when executing import processing that is based on the data in response to the import instruction, a user whose personal setting information is to be deleted, based on last login time and date stored in the storage, and deleting personal setting information stored in the storage in association with the identified user so that the personal setting information does not reach a registration upper limit after import.

Further features of the present disclosure will become apparent from the following description of exemplary embodiments with reference to the attached drawings.

BRIEF DESCRIPTION OF THE DRAWINGS

FIG. 2 is a block diagram illustrating a program configuration of an MFP.

FIGS. 3A and 3B illustrate screen examples of an export screen and an import screen of an MFP.

FIGS. 7A, 7B, and 7C illustrate an example of an upper limit management table, a user information management table, and a setting information management table of an MFP.

FIGS. 8A and 8B illustrate an example of a user information management table and a setting information management table of an MFP.

FIGS. 9A and 9B illustrate an example of a flowchart of import processing of personal setting information of an MFP.

FIGS. 11A and 11B illustrate screen examples of a warning display in importing information into an MFP.

FIGS. 13A and 13B illustrate an example of a flowchart of import processing of personal setting information that excludes a designated user from an automatic deletion target of an MFP.

FIGS. 17A and 17B illustrate an example of a flowchart of import processing of personal setting information that involves designatable deletion target personal setting information of an MFP.

FIGS. 19A, 19B, 19C, and 19D illustrate an example of a deletion target user designation screen and an import user designation screen of an MFP.

FIGS. 20A and 20B illustrate an example of a flowchart of import processing of personal setting information that has a function of backing up automatically-deleted personal setting information of an MFP.

DESCRIPTION OF THE EMBODIMENTS

Hereinafter, exemplary embodiments of the present disclosure will be described below with reference to the drawings.

The user management in an image forming apparatus will be described. In companies or organizations, due to regrouping of an organization to which a user belongs or departmental transfer, a plurality of users that has used a certain image forming apparatus is, in some cases, to use another image forming apparatus. In such cases, personal setting information stored in the previously-used image forming apparatus is required to be exported and imported into the image forming apparatus to be newly-used.

If a large amount of personal setting information is already stored in the newly-used image forming apparatus, all pieces of personal setting information cannot be imported due to storage capacity shortage. In view of such a case, the following storage structure will be described according to an exemplary embodiment. More specifically, for securing required storage capacity, personal setting information with low priority is identified from among pieces of stored personal setting information, and the identified personal setting information is deleted. In an import destination image forming apparatus, using time and date information indicating time and date when the user logs into the image forming apparatus the last time, deletion target personal setting information is identified and deleted.

Even if the capacity of an import area becomes insufficient when personal setting information is imported, by deleting personal setting information with low priority, the above-described structure enables an import work of new personal setting information to be continued, without bothering an administrator. The structure can consequently reduce the burden on the administrator. Hereinafter, a specific structure will be described.

Figure 1:
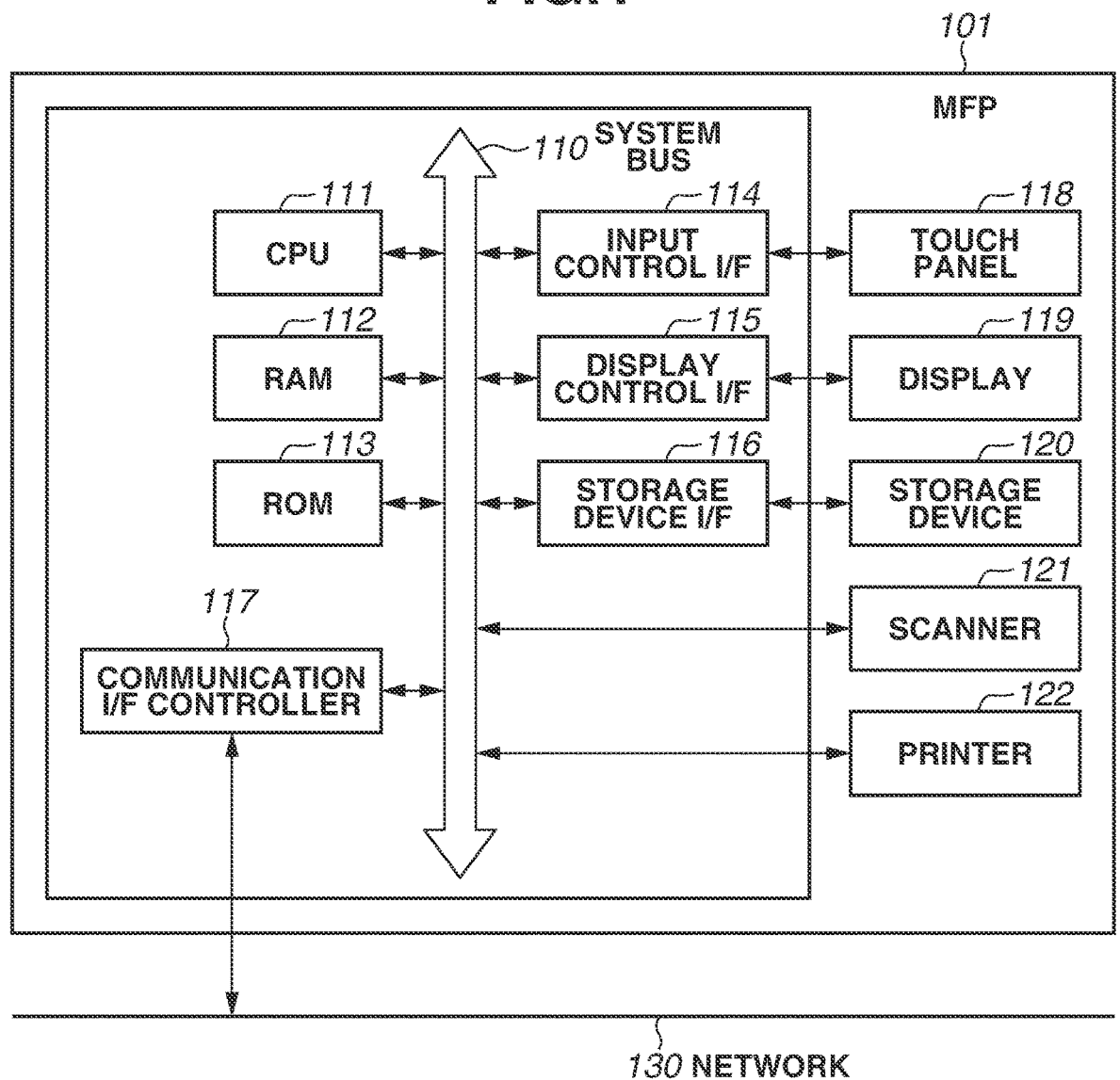
FIG. 1 is a block diagram illustrating a controller unit of a multifunction peripheral (MFP).

FIG. 1 is a block diagram illustrating an example of a hardware configuration of a multifunction peripheral (MFP) 101 according to a first exemplary embodiment. The MFP 101 is an example of an information processing apparatus.

A central processing unit (CPU) 111, a random access memory (RAM) 112, a read-only memory (ROM) 113, an input control interface (I/F) 114, a display control I/F 115, a storage device I/F 116, and a communication I/F controller 117 are connected to a system bus 110. In addition, a scanner 121 and a printer 122 are also connected to the system bus 110. The components connected to the system bus 110 can exchange data with one another via the system bus 110.

The CPU 111 is a device that controls each device and calculates or processes data. The RAM 112 is a volatile memory and is used as a main memory of the CPU 111 or a temporary storage area such as a work area. The ROM 113 is a nonvolatile memory. In the ROM 113, image data or other data and various programs for operating the CPU 111 are stored in predetermined areas. In accordance with programs stored in the ROM 113, for example, the CPU 111 controls the components of the MFP 101 using the RAM 112 as a work memory. The programs for operating the CPU 111 are not limited to the programs stored in the ROM 113, and may be stored in a storage device 120. By the CPU 111 executing processing based on a program, a below-described software configuration of the MFP 101 and below-described processing illustrated in a flowchart are implemented. In the MFP 101, one CPU 111 executes processing illustrated in a flowchart, but the processing may be executed in another manner. For example, undermentioned processing illustrated in a flowchart may be executed by a plurality of processors, memories, or storages in cooperation with each other.

The input control I/F 114 receives a user operation, generates a control signal corresponding to the operation, and supplies the generated control signal to the CPU 111. For example, as an input device for receiving a user operation, the input control I/F 114 is connected with a character information input device such as a keyboard (not illustrated), hardware keys for directly inputting numerical values, or a pointing device such as a touch panel 118. The touch panel 118 is an input device configured to output coordinate information corresponding to a touched position on a planarly-formed input unit, for example. Hereinafter, in the present exemplary embodiment, an operation on a touch panel will be described, but it should be appreciated that an operation is not limited to the operation on the touch panel. Based on a control signal generated and supplied by the input control I/F 114 in response to a user operation performed on the input device, the CPU 111 controls each component of the MFP 101 in accordance with a program. The MFP 101 can thereby be caused to perform an operation corresponding to the user operation.

The display control I/F 115 outputs, to a display 119, a display signal for displaying an image. For example, based on a program, the CPU 111 supplies a generated display control signal to the display control I/F 115. Based on the display control signal, the display control I/F 115 generates a display signal, and outputs the generated display signal to the display 119. For example, based on the display control signal generated by the CPU 111, the display control I/F 115 causes the display 119 to display a graphical user interface (GUI) screen forming a GUI. In addition, the touch panel 118 may be formed integrally with the display 119. For example, the touch panel 118 has light transmittance that does not disturb displaying on the display 119, and is attached to an upper layer of a display surface of the display 119. Then, an input coordinate on the touch panel 118 and a display coordinate on the display 119 are associated with each other. This can form a GUI that makes the user feel as if the user could directly operate a screen displayed on the display 119.

The storage device 120 such as a hard disk drive (HDD) or a flash memory is connected to the storage device I/F 116. Based on the control of the CPU 111, the storage device I/F 116 reads data from the storage device 120 or writes data into the storage device 120. The storage device 120 may be used in place of the RAM 112 or the ROM 113.

Based on the control of the CPU 111, the communication I/F controller 117 communicates with various networks such as a local area network (LAN), the Internet, a wired network, or a wireless network. Various apparatuses such as a personal computer (PC), another MFP, another printer, and a server are connected to the network 130 so as to be able to communicate with the MFP 101. In addition, connection with an external authentication server described below is also performed via the communication I/F controller 117.

Based on the control of the CPU 111, the scanner 121 reads an image on a document and generates image data. For example, in response to a user instruction input via the input control I/F 114, the CPU 111 controls the scanner 121 to execute scan processing. The scanner 121 reads a document placed on a platen or an automatic document feeder (ADF), converts the document into digital data, and generates image data. Then, the scanner 121 stores the generated image data into the storage device 120 via the storage device I/F 116.

Based on the control of the CPU 111, the printer 122 performs printing processing of image data saved in the storage device 120. For example, in response to a user instruction input via the input control I/F 114 or an instruction indicated by a command input from an external device via the communication I/F controller 117, the CPU 111 controls the printer 122 to execute printing processing. The printer 122 reads image data from the storage device 120, converts the image data into a printable data format, and prints the image data onto a paper document.

The software configuration of the MFP 101 will be described with reference to FIG. 2. The software configuration of the MFP 101 illustrated in FIG. 2 indicates an example for describing the present exemplary embodiment, and may include another component or may be a different configuration having a similar effect to that of the present exemplary embodiment. Programs corresponding to the respective control units illustrated in FIG. 2 are stored in the ROM 113, and loaded into the RAM 112 as necessary and executed by the CPU 111 on start-up or in using functions. The control units illustrated in FIG. 2 are thereby implemented.

The MFP 101 includes control units such as a display operation control unit 201, an authentication control unit 202, a setting value storage control unit 203, a setting value setting control unit 204, and a setting value input/output control unit 205. In addition, the MFP 101 has one or more functions such as copy, scan, or fax, and a control unit is provided for each function. As an example, FIG. 2 illustrates a copy control unit 210, a scan control unit 211, and a transmission control unit 212. It should be appreciated that the MFP 101 may have functions related to processing of the MFP 101 aside from the functions illustrated in FIG. 2, and include control units corresponding to the respective functions.

Based on the control of the CPU 111, the display operation control unit 201 controls the input control I/F 114 and the display control I/F 115. For example, based on an instruction from another control unit, the display operation control unit 201 performs displaying on the display 119 via the display control I/F 115 or performs processing of acquiring information input by the user on the touch panel 118 via the input control I/F 114. The display operation control unit 201 notifies each control unit of the acquired information.

A user information database (DB) 320 is stored in the storage device 120. The user information DB 320 stores an individual person as a registrant, that is to say, a valid user of the MFP 101, and stores authentication information of the registrant. The authentication information includes a user identifier (user name) indicating a registrant, and a password. More specifically, the user information DB 320 stores identification information for identifying a user and a password, in association with each other.

Based on the control of the CPU 111, the authentication control unit 202 performs authentication processing for identifying a user, and determines whether an operator of the MFP 101 is a valid user of the MFP 101. Specifically, an operator inputs a user name and a password. Then, if the input pair of the user name and the password and a pair of a user name and a password that is stored in the user information DB 320 match, the authentication control unit 202 determines that the operator is a valid user. The authentication control unit 202 starts a session if an operator is a valid user. In addition, the authentication control unit 202 ends the session if the operator ends the use of the MFP 101. Hereinafter, determining that an operator is a valid user and starting a session will be referred to as "login" and ending the session will be referred to as "logout". In addition, the authentication control unit 202 controls the user information DB 320. The authentication control unit 202 provides functions such as registration and deletion of a person, and update of personal authentication information.

The authentication control unit 202 may be connected to an external authentication server (not illustrated) via the communication OF controller 117, and use an authentication result of the authentication server. Authentication information is exchanged with the external authentication server using a known technique.

Next, the setting value storage control unit 203 will be described. The setting value storage control unit 203 is a control unit for storing a device setting and a personal setting based on the control of the CPU 111. The device setting is a setting referred to by all users, and the personal setting is a setting that can be referred to only by an individual user.

A setting DB 400 is stored in the storage device 120. The setting DB 400 stores device setting information (shared setting information) and personal setting information. The device setting information is information that can be referred to and used by an operator in a state in which the user has not logged into the MFP 101. The personal setting information is information that can be referred to and used only by an individual user serving as a registrant. In addition, each piece of setting information (device setting information or personal setting information) includes a setting item and a setting value of the setting item. In the following description, the device setting information and the personal setting information will be collectively referred to as setting information as appropriate.

The setting value storage control unit 203 stores the device setting information and the personal setting information into the setting DB 400. The setting value setting control unit 204 is used for the setting value storage control unit 203 storing the setting information into the setting DB 400. The setting value setting control unit 204 has a function of registering or changing the values of the device setting information and the personal setting information, receives user inputs from the touch panel 118, and registers the setting information into the setting DB 400, changes the setting information in the setting DB 400, and deletes the setting information from the setting DB 400. At this time, the setting value setting control unit 204 receives inputs of the device setting information and the personal setting information in a distinguishable manner, and saves setting values corresponding to the respective pieces of setting information.

A management table DB 500 is stored in the storage device 120. The management table DB 500 stores information such as the number of pieces of setting information set in the setting DB 400, and a data size. The setting value storage control unit 203 updates the management table DB 500 in response to the update of the setting DB 400. Furthermore, the setting value storage control unit 203 refers to the management table DB 500, and appropriately executes automatic deletion of data (setting information) registered in the setting DB 400.

Figure 4:
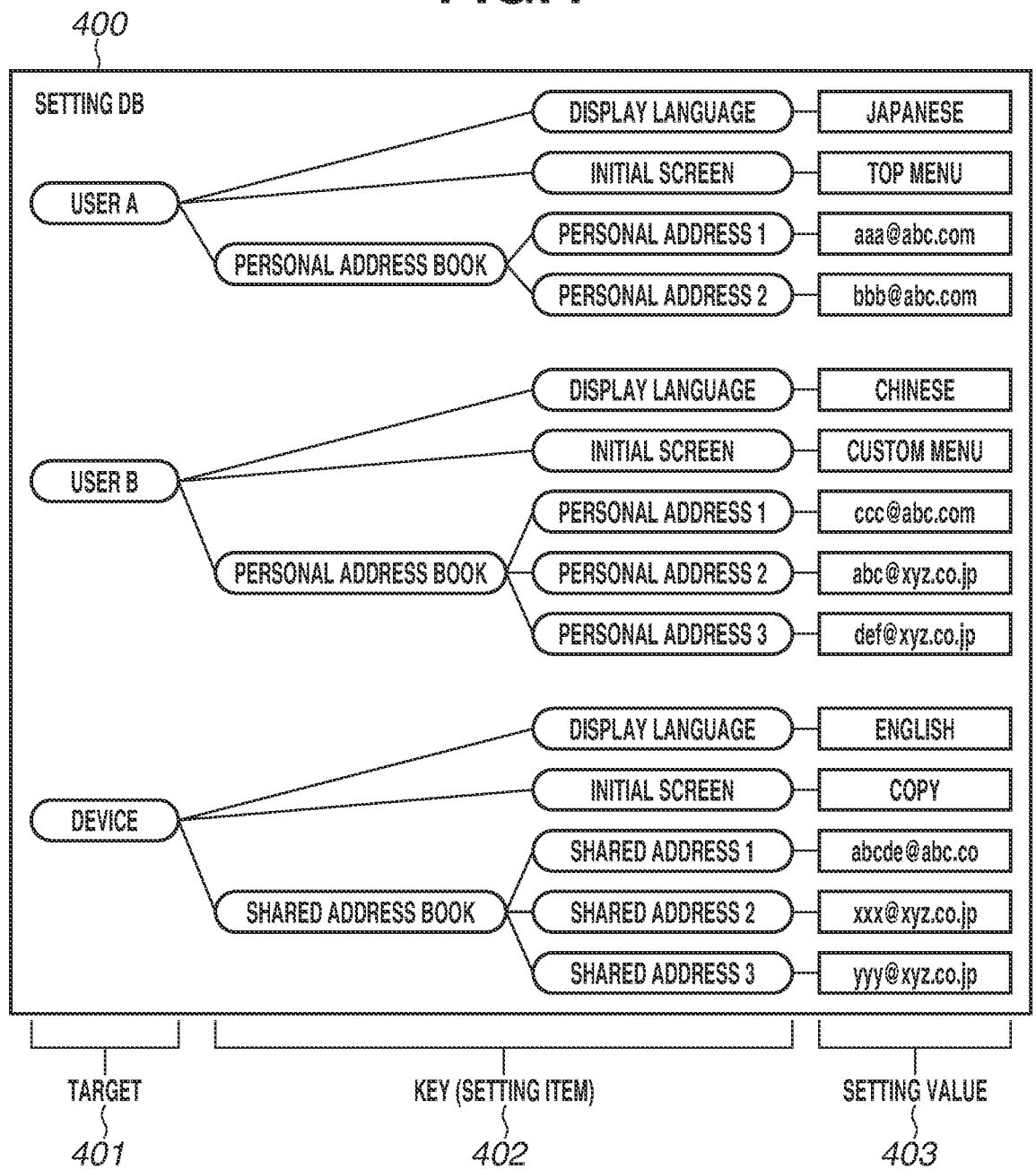
FIG. 4 is a configuration diagram of a setting database (DB) of an MFP.

FIG. 4 illustrates an example of a data configuration of the setting DB 400. The setting DB 400 stores setting information including a pair of a key (setting item) for identifying a setting item and a setting value. The setting DB 400 is represented in a hierarchical structure. A first hierarchy includes information regarding a target 401. The target 401 is identification information for identifying whether the setting information is device setting information or personal setting information, and for identifying each user. As the target 401 for a person, a user identifier indicating that the target is a person and identifying each user is used. In FIG.

4, "device" is used as information for identifying a device, and "user A" and "user B" are used as user identifiers of users A and B. Based on a combination of the target 401 and a setting item 402, a corresponding setting value 403 is determined.

In FIG. 4, display language, initial screen, personal address book, and shared address book are used as setting items. The display language is information indicating a language type of characters to be displayed on the display 119. The initial screen is information indicating a screen to be initially displayed when the user logs into the MFP 101. The personal address book and the shared address book are address books to be used for designating a destination when scanned data is transmitted. The setting items illustrated in FIG. 4 are just examples. Aside from these setting items, keyboard setting, accessibility setting, and functions to be displayed after login can be used. These setting items can be customized as personal settings. In addition, the personal setting information may include personal data for each function such as an address book of each user.

In the example illustrated in FIG. 4, a setting value corresponding to a target "user A" and a key "display language" is "Japanese". A setting value corresponding to a target "user B" and the key "display language" is "Chinese". In addition, a setting value corresponding to the target "user B" and a key "personal address book-personal address 1" is "ccc@abc.com". While pieces of personal setting information corresponding to the number of users are stored, device setting information is a unique setting value in the MFP 101. In the example illustrated in FIG. 4, a setting value corresponding to a target "device" and a key "display language" is "English".

Among pieces of setting information stored in the setting DB 400, while some pieces of personal setting information and device setting information have common keys, the other pieces of setting information do not have common keys. If personal setting information and device setting information have a common key, a setting value (device setting value) of the device setting information is sometimes treated as a default value when a setting value (personal setting value) of the personal setting information is not registered. In the example illustrated in FIG. 4, personal setting information of a user C is not registered. In this case, "English" as a device setting value is applied to the display language of the user C.

In addition, if personal setting information and device setting information do not have common keys, personal setting information is not registered or registration is treated as 0. For example, a key "personal address book" is a key existing only in setting information with the target "person". In contrast, a key "shared address book" is a key existing only in setting information with the target "device". In the example illustrated in FIG. 4, the personal address book of the user C has 0 registration, but the user C can refer to a shared address 1, a shared address 2, and a shared address 3 of the shared address book because the device setting information exists.

The setting value storage control unit 203 reads a personal setting value in the setting DB 400 at a time of login, and reflects the personal setting value in each setting of the MFP 101. A user can therefore use the MFP 101 customized in accordance with personal setting information registered by the user. In addition, the setting value storage control unit 203 reads a device setting value in the setting DB 400 at a time of logout, and reflects the device setting value in each setting of the MFP 101. Thus, functions that can be used in a logout state can be used based on a device setting value.

Figure 5:
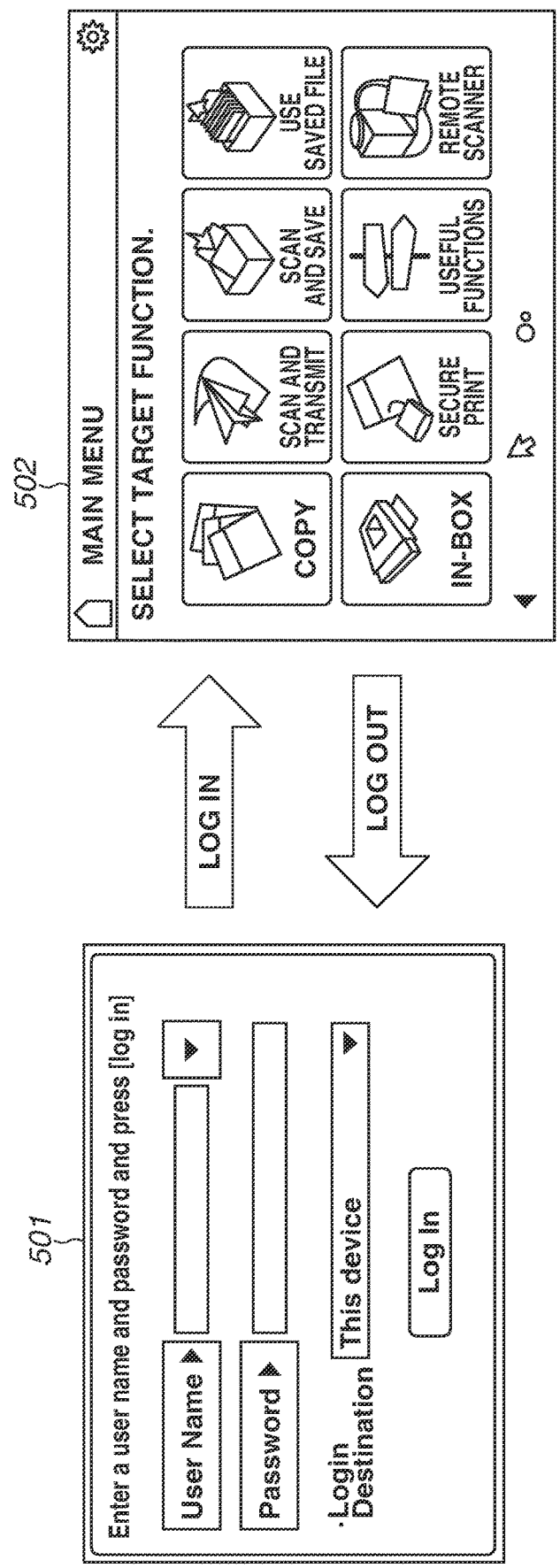
FIG. 5 illustrates a screen example of a login screen of an MFP.

As an example of a personal setting, a display language setting will be described with reference to FIG. 5. The pieces of setting information illustrated in FIG. 4 are assumed to be stored in the setting DB 400. FIG. 5 illustrates a state in which the user A logs into the MFP 101, and a screen transitions from a login screen 501 to a top menu (main menu) screen 502. As illustrated in FIG. 4, in the display language setting of the device setting, a setting value corresponding to the target "device" and the key "display language" is "English". On the other hand, as the display language of the user A, a setting value corresponding to the target "user A" and the key "display language" is "Japanese".

The login screen 501 is a screen displayed in a logout state. On the login screen 501, the device setting information is used and characters on the login screen 501 are displayed in "English", which is a setting value of the display language.

The main menu screen 502 is a screen to be displayed after authentication has succeeded by login processing and the state has shifted from the logout state to a login state. On the main menu screen 502, the personal setting information of the user A is used and characters on the main menu screen 502 are displayed in "Japanese", which is a setting value of the display language. If the user A logs out from the MFP 101, the display language setting of the device is reflected and characters on the login screen 501 are displayed in "English".

FIGS. 7A to 7C are tables illustrating a data configuration of the management table DB 500. An upper limit management table 700, a user information table 710, and a setting information management table 720 are stored in the management table DB 500.

FIG. 7A illustrates an example of the upper limit management table 700. In the upper limit management table 700, a maximum number of users 701 indicating an upper limit of the number of users who can register personal setting information into the setting DB 400, and a maximum storage capacity 702 indicating an upper limit value of a data size of registerable personal setting information are stored. In the example illustrated in FIG. 7A, the maximum number of users 701 is 10 and the maximum storage capacity 702 is 10 MB.

FIG. 7B illustrates an example of the user information table 710. In the user information table 710, a user identifier 711 of an individual user that has registered personal setting information, a used size 712 indicating a data size used by the personal setting information, and last usage time and date 713, on which each user has used the corresponding setting information, are stored in association with each other. In the present exemplary embodiment, the description will be given assuming that the last usage time and date 713 correspond to last login time and date, which are time and date on which the user logged into the MFP 101 the last time. More specifically, when the user logs into the MFP 101, the login is notified from the authentication control unit 202 to the setting value setting control unit 204, and the setting value setting control unit 204 instructs the setting value storage control unit 203 to update the last usage time and date 713. With this instruction, the last usage time and date 713 are updated. The last usage time and date 713 may be naturally updated at another timing. For example, the last usage time and date 713 may be updated at a timing of addition, update, or deletion of personal setting information, or the last usage time and date 713 may be updated at a time of logout. In the example illustrated in FIG. 7B, a used size of the user is 2 MB and the last usage time and date correspond to "2018/5/4 10:21". The respective used sizes and the last usage times and dates of the users B, C, D, and E are described in a similar manner.

FIG. 7C illustrates an example of the setting information management table 720. In the setting information management table 720, a number of users with registered personal setting 721 indicating the number of users who have registered personal setting information, and a used storage capacity 722 indicating a total used size of personal setting information of each user are stored. In the example illustrated in FIG. 7C, the setting information management table 720 indicates that the number of users who have registered personal setting information is five, and the total used size of pieces of personal setting information of all the users is 8 MB.

The management tables illustrated in FIGS. 7A, 7B, and 7C are controlled by the setting value storage control unit 203. If the setting value storage control unit 203 is instructed by the setting value setting control unit 204 to register, update, or delete personal setting information, the setting value storage control unit 203 refers to the upper limit management table 700, and checks whether the number of users and the storage capacity exceed the maximum number of users 701 and the maximum storage capacity 702 after the update of personal setting information. If the number of users and the storage capacity do not exceed the respective upper limit values, the setting value storage control unit 203 updates the setting DB 400 and updates values of the used size 712 of a corresponding user identifier in the user information table 710 and the used storage capacity 722 in the setting information management table 720.

In addition, if personal setting information of a user is newly added or if personal setting information of an existing user is deleted, the setting value storage control unit 203 adds the user identifier 711 to the user information table 710 or deletes the user identifier 711 from the user information table 710. If a user identifier is newly added, the setting value storage control unit 203 accordingly updates the used size 712 and the last usage time and date 713 of the corresponding user in the user information table 710. Furthermore, the setting value storage control unit 203 updates values of the number of users with registered personal setting 721 and the used storage capacity 722 in the setting information management table 720.

If the number of users or the storage capacity exceeds the upper limit value of the maximum number of users or the maximum storage capacity, the setting value storage control unit 203 returns an error to the setting value setting control unit 204, and does not update personal setting information. In this case, an error indicating that personal setting cannot be saved is displayed on the display 119 via the display operation control unit 201.

Next, an export function and an import function of personal setting information will be described with reference to FIGS. 3A and 3B. FIG. 3A illustrates an example of a personal setting export screen for exporting personal setting information. A user 301 is a user whose personal setting information is registered, and a checkbox 302 is a checkbox for setting whether to include personal setting information of a corresponding user in an export target. A button 303 is a button for collectively checking the checkboxes 302 corresponding to all the users. A button 304 is a button for unchecking all the selected checkboxes 302. A button 305 is a button for issuing an export execution instruction of personal setting information of a user selected in the checkbox 302. In the example illustrated in FIG. 3A, pieces of personal setting information of the user A, the user B, and the user C are selected as an export target.

A screen illustrated in FIG. 3A is displayed by the display operation control unit 201. The screen may be displayed on the display 119 included in the MFP 101. Alternatively, for example, display data may be htmlized and the htmlized display data may be displayed on a browser of an external PC (not illustrated) via the communication I/F controller 117. In addition, the screen may be displayed via the communication I/F controller 117 on a dedicated application installed on the external PC. In other words, the MFP 101 can receive an export instruction from an operation unit included in the MFP 101 or from the outside.

If the export instruction is issued by the press of the button 305, the display operation control unit 201 requests the setting value input/output control unit 205 to export personal setting information of the selected user. Via the setting value storage control unit 203, the setting value input/output control unit 205 acquires personal setting information of the selected user from the setting DB 400, and further acquires information regarding the used size 712 and the last usage time and date 713 of the corresponding user from the user information table 710. The setting value input/output control unit 205 generates personal setting migration data 600 from the information acquired from the setting value storage control unit 203.

Figure 14:
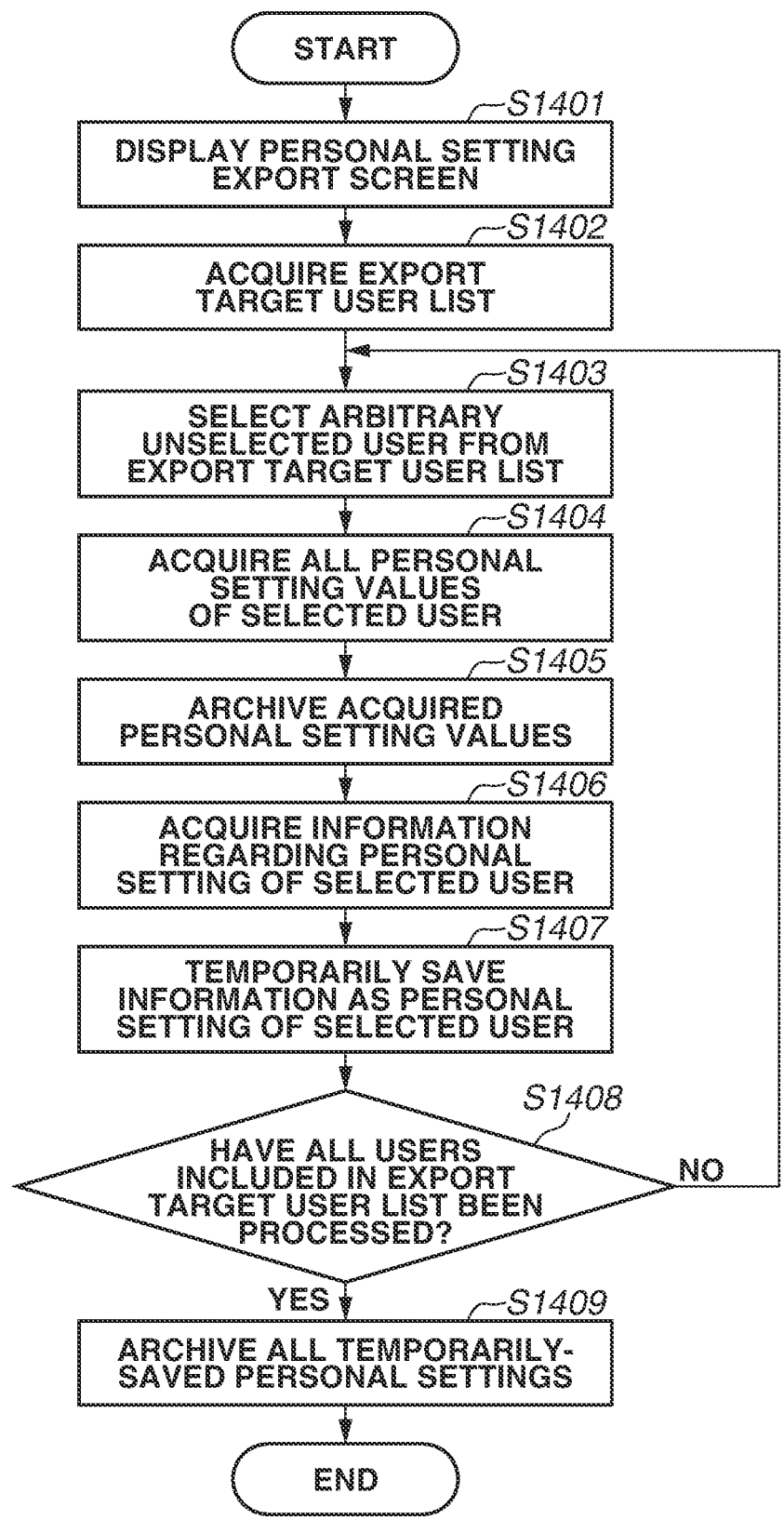
FIG. 14 illustrates an example of a flowchart of export processing of personal setting information of an MFP.

Processing of selecting a user and exporting personal setting information will now be described with reference to a flowchart in FIG. 14. This flow is executed by the CPU 111 controlling a program stored in the ROM 113.

In step S1401, the CPU 111 displays a personal setting export screen illustrated in FIG. 3A. In step S1402, the CPU 111 acquires users selected by an administrator on the personal setting export screen, as an export target user list.

In step S1403, the CPU 111 selects arbitrary one unselected user from among the export target user list. In step S1404, the CPU 111 acquires all personal setting information of the user selected in step S1403. Specifically, the CPU 111 reads all pieces of data corresponding to a user identifier of the user selected in step S1403, from the setting DB 400.

In step S1405, the CPU 111 generates an archive file using the personal setting information read in step S1404. An arbitrary archive format such as a tape archive (tar) is used for the archive file. In step S1406, the CPU 111 acquires information regarding the user selected in step S1403. Specifically, the CPU 111 acquires the user identifier 711, the used size 712, and the last usage time and date 713 from the user information table 710. The information regarding the user is not limited to these, and other information may be acquired or part of the information may be acquired.

In step S1407, the CPU 111 temporarily saves the personal setting information of the user selected in step S1403. Specifically, the CPU 111 saves, into a temporary storage area (not illustrated), the archive file of the personal setting information of the user selected in step S1403, generated in step S1405, and the user information acquired in step S1406.

In step S1408, the CPU 111 determines whether all the users included in the export target user list have been processed. If it is determined that all the users have been processed (YES in step S1408), the processing proceeds to step S1409. If it is determined that an unprocessed (unselected) user remains in the export target user list (NO in step S1408), the processing returns to step S1403, and another user is selected.

In step S1409, the CPU 111 combines archive files of all the users included in the export target user list that have been temporarily saved in step S1407, into one file as personal setting migration data. Specifically, the CPU 111 archives the personal setting information into one file using a format such as tar as described above, and deletes the personal setting information of the users that has been temporarily saved in step S1407.

Figure 6:
FIG. 6 illustrates a table indicating an example of personal setting migration data of an MFP.

FIG. 6 is a table illustrating an example of the personal setting migration data 600. A user identifier 601 is a user identifier of personal setting information to be migrated, a used size 602 is a used size of personal setting information of each user, and last usage time and date 603 are last usage time and date of each user. As these pieces of information, values acquired from the user information table 710 in FIG. 7B are stored. An archive file 604 is an archive file of personal setting information of each user, and a combination of the setting item 402 and the setting value 403 of a target user in the setting DB 400 is archived and recorded for each user. For example, the personal setting information is archived in an arbitrary archive format such as the tar format. In the example illustrated in FIG. 6, the personal setting information is archived and stored as a file named "user name+".tar"".

When the personal setting migration data 600 is generated, a screen (not illustrated) is displayed. On the screen (not illustrated), the user that has issued an export instruction on the screen illustrated in FIG. 3A stores corresponding data into a file system on a PC or a memory medium such as a universal serial bus (USB) memory.

By importing the personal setting migration data 600 into another MFP 102, personal setting information of the user that is to be exported can be stored into the MFP 102. The MFP 102 is another device having the same controller unit and the same program configuration as the MFP 101 illustrated in FIG. 1. Data such as personal setting information that is stored in the MFP 102 is different from the data stored in the MFP 101.

FIG. 3B illustrates an example of a personal setting import screen for issuing an import execution instruction on the MFP 102. The screen may be displayed on the display 119 included in the MFP 101. Alternatively, for example, display data may be htmlized and the htmlized display data may be displayed on a browser of an external PC (not illustrated) via the communication I/F controller 117. In addition, the screen may be displayed via the communication I/F controller 117 on a dedicated application installed on the external PC. In other words, the MFP 102 can receive an import instruction from an operation unit included in the MFP 102 or from the outside.

A field 311 is a field for inputting a path of the personal setting migration data 600 to be imported. By inputting a file path of the personal setting migration data 600 into the field 311, and pressing an import execution button 312, personal setting information of the user selected in the MFP 101 as an export target is imported into the MFP 102. Specifically, the setting value input/output control unit 205 of the MFP 102 decompresses an archive file of the personal setting migration data 600, and further decompresses the archive file 604 of personal setting information of each user. The setting value input/output control unit 205 instructs the setting value storage control unit 203 to restore personal setting information decompressed for each user, into the setting item 402 and the setting value 403 of the target user in the setting DB 400. The personal setting information of the user that has been selected as an export target in the MFP 101 is thereby restored into the MFP 102. The import of personal setting information will be described in detail below.

FIG. 8A illustrates an example of a user information table 800 of the MFP 102, and FIG. 8B illustrates an example of a setting information management table 810. An upper limit management table of the MFP 102 is the same as the upper limit management table 700 in FIG. 7A.

The description will be given of a case of importing the personal setting migration data 600 in FIG. 6 into the MFP 102 in this state. In the MFP 102, 9.75-MB personal setting information corresponding to nine users is stored. On the other hand, 5-MB personal setting information corresponding to three users is stored in the personal setting migration data 600. Thus, if all the personal setting information is imported, the number of users and the storage capacity exceed the maximum number of users and the maximum storage capacity in the upper limit management table 700. Accordingly, for importing all the personal setting migration data 600, it is necessary to delete a required amount of personal setting information from the registered personal setting information.

Thus, in the present exemplary embodiment, first of all, personal setting information of a user included in both of the personal setting migration data 600 and the user information table 800 is deleted. Subsequently, the user information table 800 is referred to, and personal setting information of users with old last usage times and dates 801 is deleted by an amount required for import.

In this example, because personal setting information of the user B is included in both of the personal setting migration data 600 and the user information table 800, first of all, the personal setting information of the user B is deleted from the user information table 800. As a result, the number of users who have registered personal setting information of the MFP 102 becomes 8, and the total used size of the personal setting information becomes 7.75 MB. Nevertheless, if the 5-MB personal setting information corresponding to the three users that are included in the personal setting migration data 600 is imported, the number of users and the storage capacity exceed the upper limit values. Thus, personal setting information of a user Y who is a user with next oldest last usage time and date 801 is deleted. As a result, the number of users with registered personal setting information of the MFP 102 becomes 7, and the total used size of the personal setting information becomes 7.5 MB. The number of users consequently falls within the range defined by the upper limit value, but the 5-MB personal setting information in the personal setting migration data 600 cannot be stored because the storage capacity exceeds the upper limit value 10 MB due to the addition.

For this reason, personal setting information of a user 4 with next oldest last usage time and date 801 is further deleted. As a result, the number of users with registered personal setting information of the MFP 102 becomes 6, and the total used size of the personal setting information becomes 7 MB. Nevertheless, the personal setting migration data 600 cannot be imported yet because 5 MB required for import has not been secured. In a similar manner, if pieces of personal setting information of a user 5 (used size: 0.5 MB) and a user 2 (used size: 2 MB) are deleted in the ascending order of the last usage time and date 801 of the users, the number of users with registered personal setting information of the MFP 102 becomes 4, and the total used size of the personal setting information becomes 4.5 MB. As a result, it becomes possible to import all the personal setting migration data 600 into the MFP 102.

In the present exemplary embodiment, as described above, the personal setting information of the user B included in both of the personal setting migration data 600 and the user information table 800 is preferentially deleted.

If the pieces of personal setting information are deleted in the ascending order of the last usage time and date 801 without preferentially deleting the personal setting information of the user B, the pieces of personal setting information are deleted in the following order (numerical value in parentheses indicates used size of each user): the user Y (0.25 MB), the user 4 (0.5 MB), the user 5 (0.5 MB), the user 2 (2 MB), a user X (1 MB), and a user 3 (0.5 MB), and 5 MB required for importing the personal setting migration data 600 is secured. In other words, although the personal setting information of the user B is to be inevitably updated because it is included in the personal setting migration data 600, the personal setting information is not included in a deletion target because the last usage time and date of the user B in the MFP 102 are newer. As a result, as compared with the case of preferentially deleting the personal setting information of the user B, the pieces of personal setting information of the user X and the user 3 are additionally deleted.

Figure 9B:
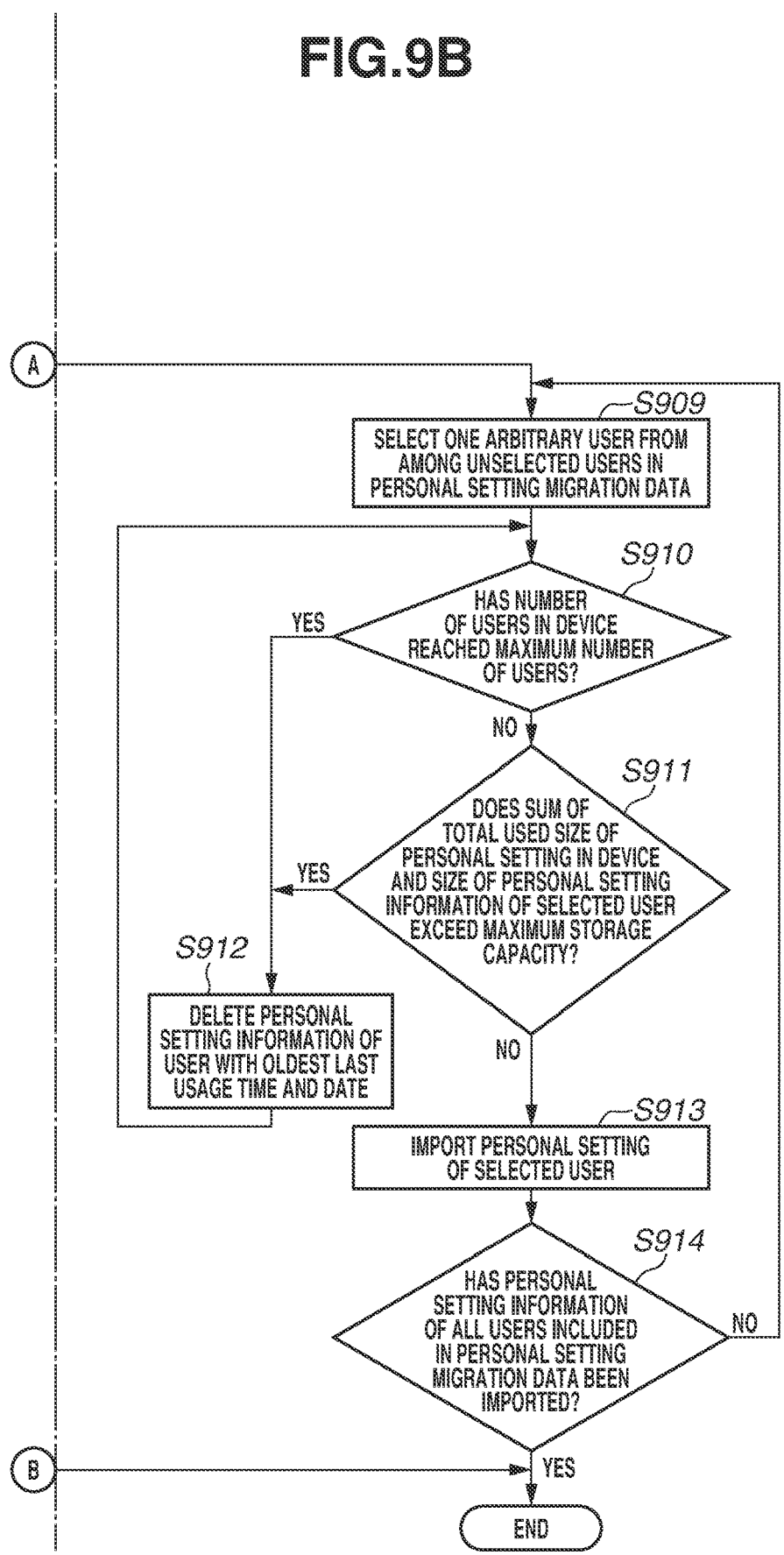

Hereinafter, import processing of personal setting information according to the present exemplary embodiment will be described with reference to a flowchart in FIGS. 9A and 9B. This flow is executed by the CPU 111 controlling a program stored in the ROM 113 of the MFP 102.

In step S901, the CPU 111 reads the personal setting migration data 600 to be imported. In step S902, the CPU 111 checks whether personal setting information of the same user as a user included in the personal setting migration data 600 read in step S901 exists in the MFP 102. Specifically, the CPU 111 determines whether the same user identifier as the user identifier 601 in the personal setting migration data 600 exists in the user information table 800 in the MFP 102. If the same user identifier exists (YES in step S902), the processing proceeds to step S903, and if the same user identifier does not exist (NO in step S902), the processing proceeds to step S904.

In step S903, the CPU 111 sets the user determined in step S902 to have the same user identifier as the user identifier included in the personal setting migration data 600, as a preferential deletion user. The number of users set as preferential deletion users is not limited to one, and a plurality of users is set if the same user identifiers exist. In step S904, the CPU 111 acquires the number of users with registered personal setting, from the setting information management table 810. In step S905, the CPU 111 acquires the used storage capacity from the setting information management table 810.

In step S906, the CPU 111 obtains a value by subtracting the number of users set as preferential deletion users in step S903, from the number of users with registered personal setting that has been acquired in step S904. The CPU 111 determines whether a total value of the obtained value and the number of users included in the personal setting migration data 600 exceeds the maximum number of users 701 in the upper limit management table 700. If the total value exceeds the maximum number of users (YES in step S906), the processing proceeds to step S908, and if the total value does not exceed the maximum number of users (NO in step S906), the processing proceeds to step S907.

In step S907, the CPU 111 obtains a value by subtracting the used size in the user information table 800 of each user set as a preferential deletion user in step S903, from the used storage capacity acquired in step S905. The CPU 111 adds the obtained value and a total value of the used sizes 602 of the users included in the personal setting migration data 600, and determines whether the added value exceeds the maximum storage capacity. If the value does not exceed the maximum storage capacity 702 (NO in step S907), the processing proceeds to step S930, and if the value exceeds the maximum storage capacity 702 (YES in step S907), the processing proceeds to step S908.

In step S930, because the number of users and the storage capacity do not exceed the maximum number of users and the maximum storage capacity if all of the personal setting migration data 600 are imported, normal import processing is performed without deleting stored personal setting information. The normal import processing is processing of restoring personal setting information by decompressing an archive file of personal setting information of each user in the personal setting migration data 600. The details of the normal import processing will not be described. If the same user exists in the personal setting migration data and the MFP 102, after personal setting information of the corresponding user in the MFP 102 is deleted, personal setting information is restored.

In step S908, the CPU 111 deletes personal setting information of the user included in the preferential deletion user set in step S903. In step S909, the CPU 111 selects arbitrary one unselected user not having been subjected to processing in step S910 and subsequent steps, from among the personal setting migration data 600.

In step S910, the CPU 111 checks the setting information management table 810, and checks whether the number of users with registered personal setting 721 has reached the maximum number of users 701 in the upper limit management table 700. If the number of users with registered personal setting 721 has reached the maximum number of users 701 (YES in step S910), the processing proceeds to step S912, and if the number of users with registered personal setting 721 has not reached the maximum number of users 701 (NO in step S910), the processing proceeds to step S911.

In step S911, the CPU 111 obtains a total value by adding the used storage capacity in the setting information management table 810 and the used size 602 in the personal setting migration data 600 of the user selected in step S909. Then, the CPU 111 checks whether the total value exceeds the maximum storage capacity 702 in the upper limit management table 700. If the total value exceeds the maximum storage capacity 702 (YES in step S911), the processing proceeds to step S912, and if the total value does not exceed the maximum storage capacity 702 (NO in step S911), the processing proceeds to step S913.

Processing in step S912 is processing to be performed in a case where the number of users or the storage capacity exceeds the upper limit value if the personal setting information of the user selected in step S909 is imported. In step S912, the CPU 111 checks the last usage time and date 801 in the user information table 800, and deletes personal setting information of a user with the oldest last usage time and date 801. Then, the processing returns to step S910, and the CPU 111 rechecks whether the personal setting information of the user selected in step S909 has become importable.

In step S913, because the number of users and the storage capacity do not exceed the upper limit values if the personal setting information of the user selected in step S909 is imported, setting information of the corresponding user in the personal setting migration data 600 is restored into the MFP 102. In step S914, the CPU 111 checks whether personal setting information of all the users included in the personal setting migration data 600 has been imported. If a user whose personal setting information has not been imported remains (NO in step S914), the processing returns to step S909. If the personal setting information of all the users included in the personal setting migration data 600 has been imported (YES in step S914), the processing in the flowchart ends.

According to the present exemplary embodiment, even if the number of users or the storage capacity exceeds the maximum number of users or the maximum storage capacity of the MFP due to the import of personal setting migration data, personal setting information of a user with oldest last usage time and date is automatically deleted so that all data can be imported. This eliminates the administrator's necessity of deleting personal setting information all by hand. Thus, it becomes possible to save the trouble of the administrator.

In the first exemplary embodiment, the description has been given of an example in which discrimination between a general user and an administrative user is not especially made as for a user who issues an import instruction of personal setting information. Thus, even if a general user issues an import instruction of personal setting information, personal setting information of a user with oldest last usage time and date is sometimes deleted automatically. Depending on the operational environment of an MFP, in some cases, only an administrative user is allowed to perform automatic deletion of personal setting information, and a general user is restricted from performing automatic deletion.

Figure 15A:
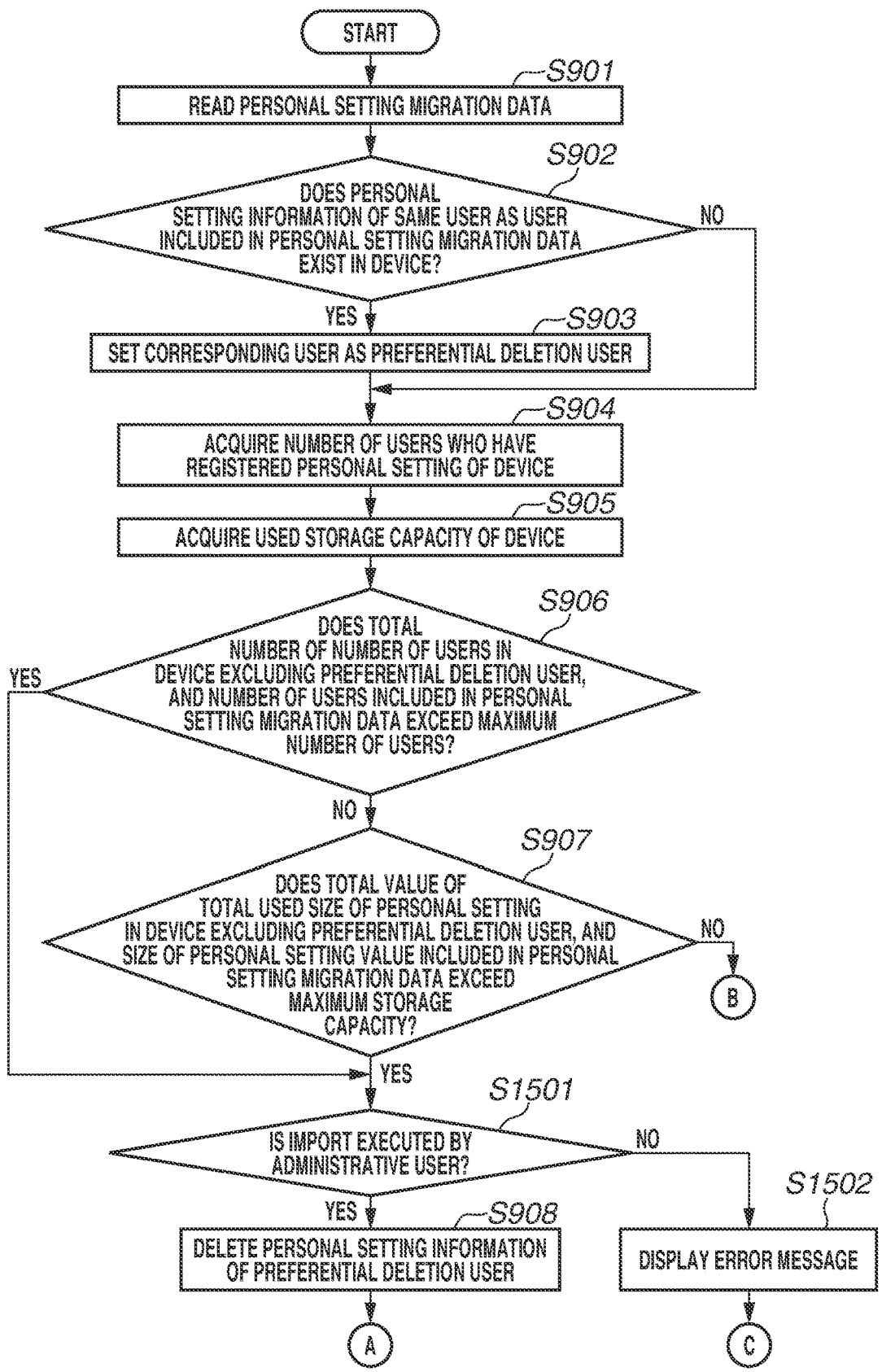
FIGS. 15A and 15B illustrate an example of a flowchart of import processing of personal setting information in which only an administrator of an MFP can automatically delete personal setting information.
Figure 15B:
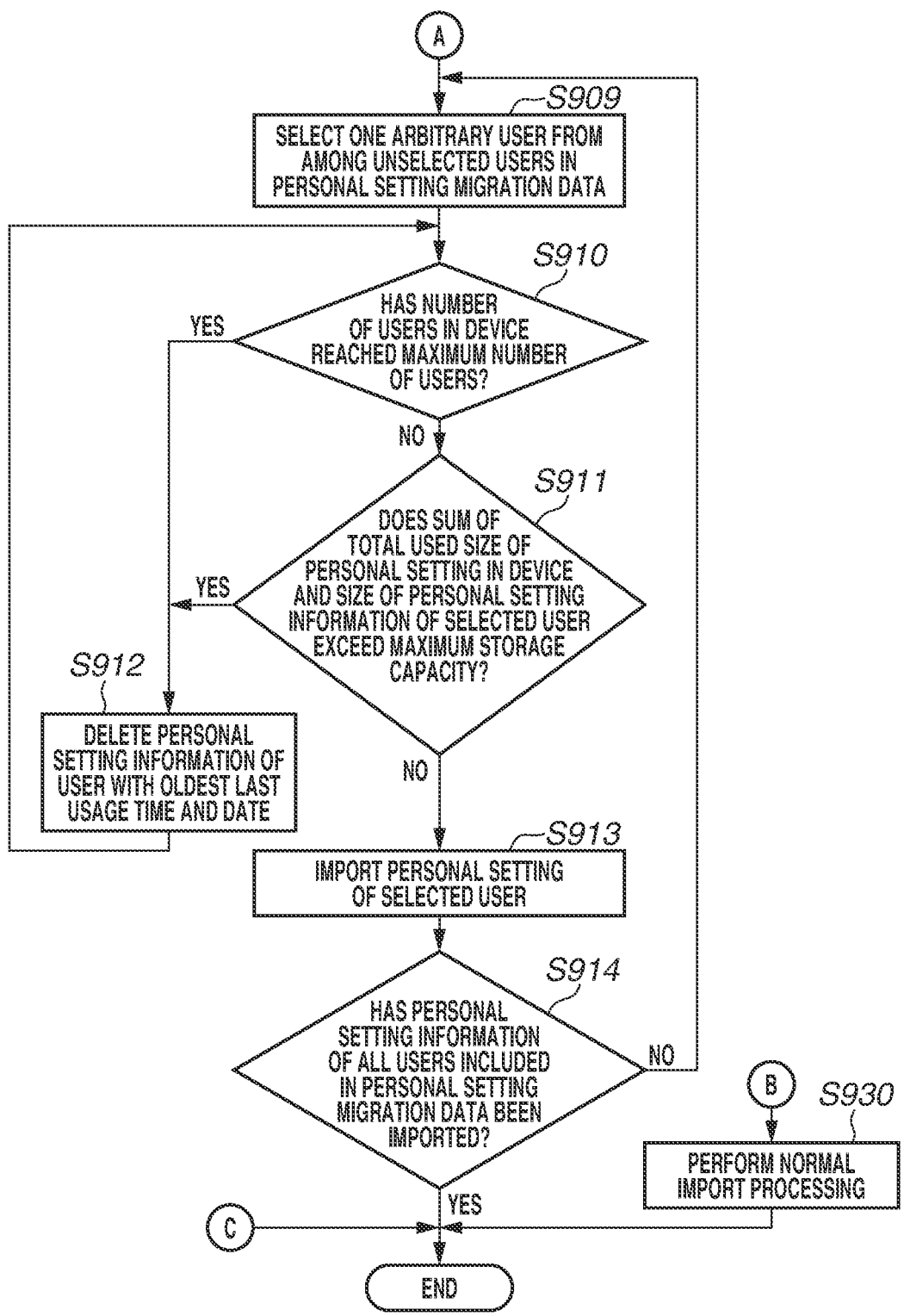

Accordingly, in a second exemplary embodiment, processing performed for dealing with such a case will be described with reference to a flowchart in FIGS. 15A and 15B. The same processes as those in the flowchart in FIGS. 9A and 9B are assigned the same step numbers, and the redundant description will be omitted.

If it is determined in step S907 that the value exceeds the maximum storage capacity 702 (YES in step S907), the processing proceeds to step S1501, and the CPU 111 acquires authority given to the user executing an import work. Depending on the authority, users are classified into an administrative user who can perform all operations of the MFP, a general user restricted from performing a setting related to the entire device such as a network setting, and a guest user who can use only a part of functions such as copying. If it is determined in step S1501 that the user executing the import of personal setting information is an administrative user (YES in step S1501), the processing proceeds to step S908, and personal setting information of a user with oldest last usage time and date is automatically deleted, and then the import is executed. If it is determined that the user executing the import of personal setting information is not an administrative user (NO in step S1501), the processing proceeds to step S1502.

In step S1502, the CPU 111 displays an error message indicating that the import cannot be executed, on the display 119 because the number of users or the size of a storage area for saving personal settings exceeds an upper limit value.

In this manner, according to the present exemplary embodiment, automatic deletion of personal setting information is performed only when an administrative user performs import, and automatic deletion of personal setting information can be restricted from being performed, when a general user performs import. Even when a general user performs import, the import can be normally performed unless the value exceeds the upper limit value of the MFP. Thus, convenience of the user is enhanced as compared with a case of simply giving import authority only to an administrator.

An MFP in a third exemplary embodiment has a function (hereinafter, referred to as an automatic deletion function) of automatically deleting personal setting information of a user with old last usage time and date so that the number of users and the storage capacity do not exceed the upper limit values managed in the upper limit management table 700, at a time of login of a user or in saving personal setting information. Furthermore, in the MFP according to the present exemplary embodiment, an administrator can set whether to enable or disable the automatic deletion function. More specifically, when the automatic deletion function is enabled, if the number of users or the storage capacity exceeds the upper limit value at a time of login of the user, personal setting information of the user with old last usage time and date is deleted. When the automatic deletion function is disabled, personal setting information is not deleted even if the number of users or the storage capacity exceeds the upper limit value.

Figure 10A:
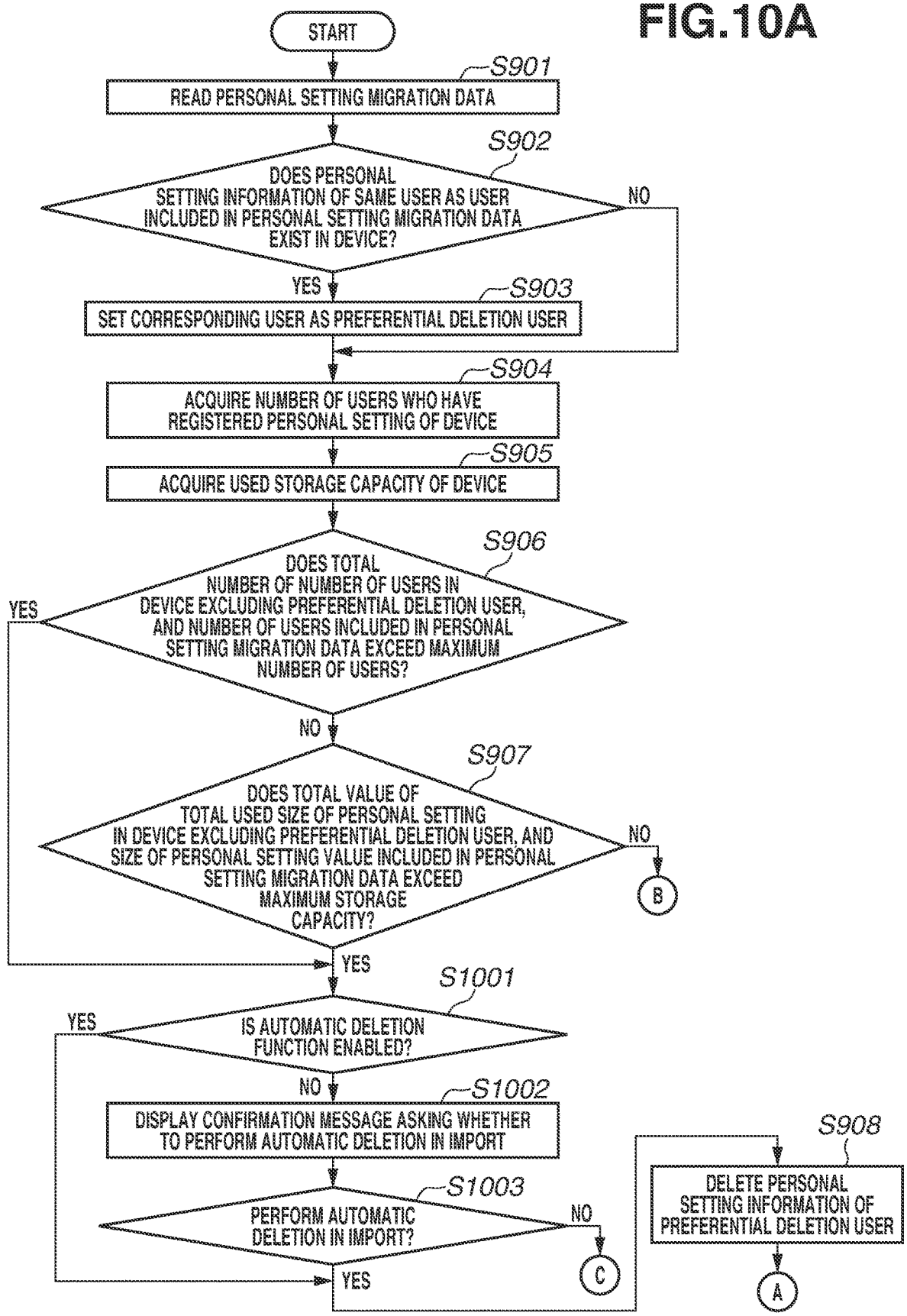
FIGS. 10A and 10B illustrate an example of a flowchart of import processing of personal setting information that involves an automatic deletion switch of an MFP.
Figure 10B:
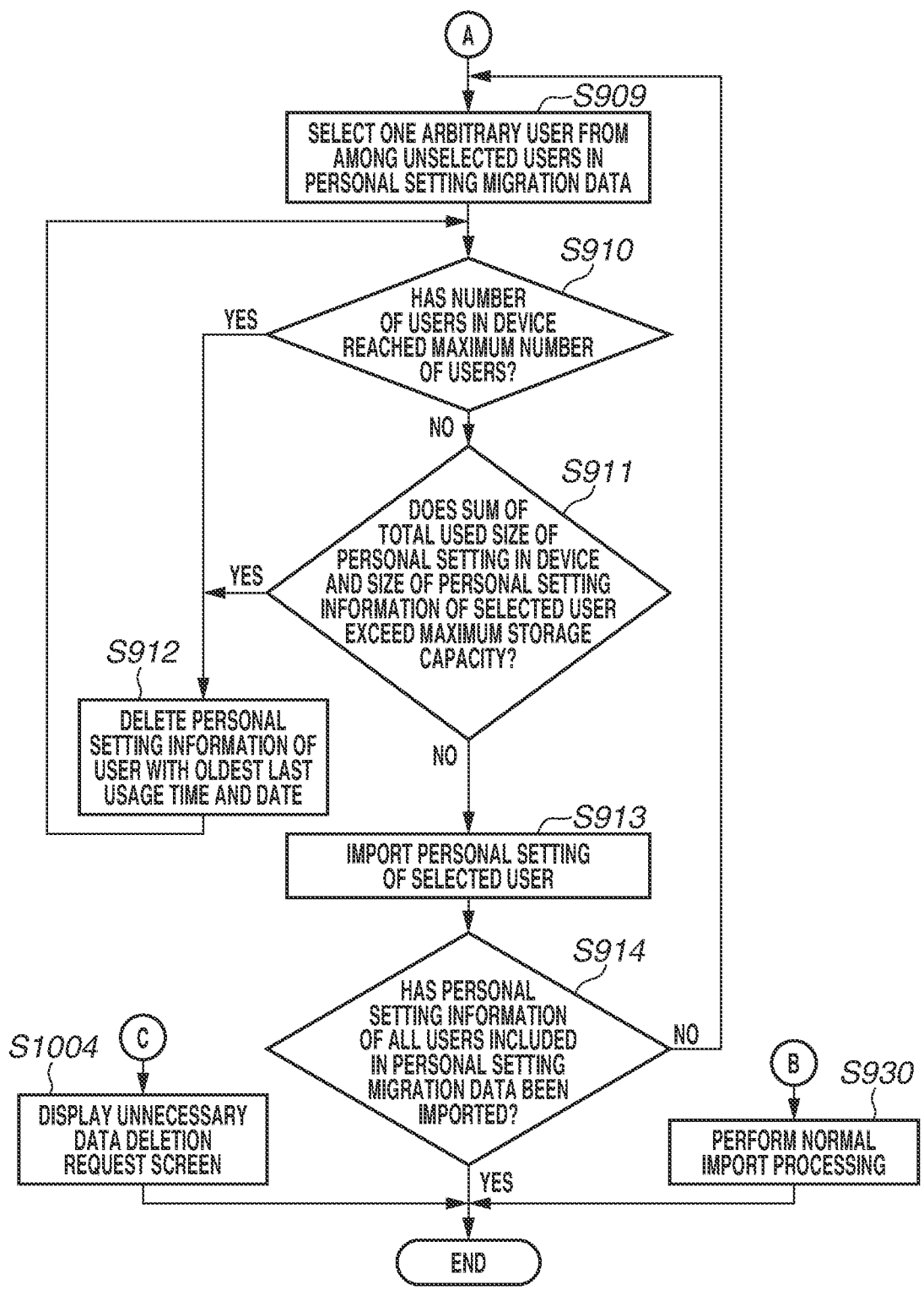

In the present exemplary embodiment, referring to a flowchart in FIGS. 10A and 10B, the description will be given of an example in which personal setting information is made deletable when personal setting information is imported, even if the automatic deletion function is disabled. The same processes as those in the flowchart in FIGS. 9A and 9B are assigned the same step numbers, and the redundant description will be omitted.

The setting value storage control unit 203 holds an automatic deletion flag (not illustrated) indicating whether to enable or disable the automatic deletion function. When the automatic deletion flag indicates ON, the above-described automatic deletion is performed, and when the automatic deletion flag indicates OFF, the above-described automatic deletion is not performed.

If it is determined in step S907 that the value exceeds the maximum storage capacity 702 (YES in step S907), the processing proceeds to step S1001. In step S1001, the CPU 111 checks a value indicated by the automatic deletion flag, and determines whether the automatic deletion function is enabled. If the automatic deletion flag indicates OFF (NO in step S1001), the processing proceeds to step S1002. If the automatic deletion flag indicates ON (YES in step S1001), the processing proceeds to step S908.

In step S1002, the CPU 111 displays a screen illustrated in FIG. 11A. On the screen illustrated in FIG. 11A, a message indicating that the number of users and/or the storage capacity exceed(s) the upper limit if personal setting migration data is imported, and a message asking the user whether to automatically delete personal setting information of an old user are displayed.

In step S1003, based on the selection made by the user via the screen illustrated in FIG. 11A, the CPU 111 determines whether to perform automatic deletion of personal setting information. If the execution of automatic deletion is selected on the screen illustrated in FIG. 11A (YES in step S1003), the processing proceeds to step S908. If the execution of automatic deletion is not selected (NO in step S1003), the processing proceeds to step S1004.

In step S1004, the CPU 111 displays a warning message illustrated in FIG. 11B, and prompts the user executing the import to delete personal setting information of an unnecessary user. If an OK button is pressed, the message is hidden and the processing ends.

According to the present exemplary embodiment, even if the automatic deletion function is disabled, the user can select whether to perform automatic deletion at a time of import. Thus, even in an operation in which automatic deletion is not performed normally, import can be easily performed.

In each of the above-described exemplary embodiments, the description has been given of an example of deleting, with no condition, personal setting information of a user with old last usage time and date. Nevertheless, even though last usage time and date of a user are old, if the user has been absent for a long time due to leave of absence from office, for example, personal setting information is sometimes desired to be left in expectation of return. In a fourth exemplary embodiment, the description will be given of an example in which, by predesignating a user to be excluded from an automatic deletion target, personal setting information of the designated user can be excluded from an automatic deletion target.

Figure 12:
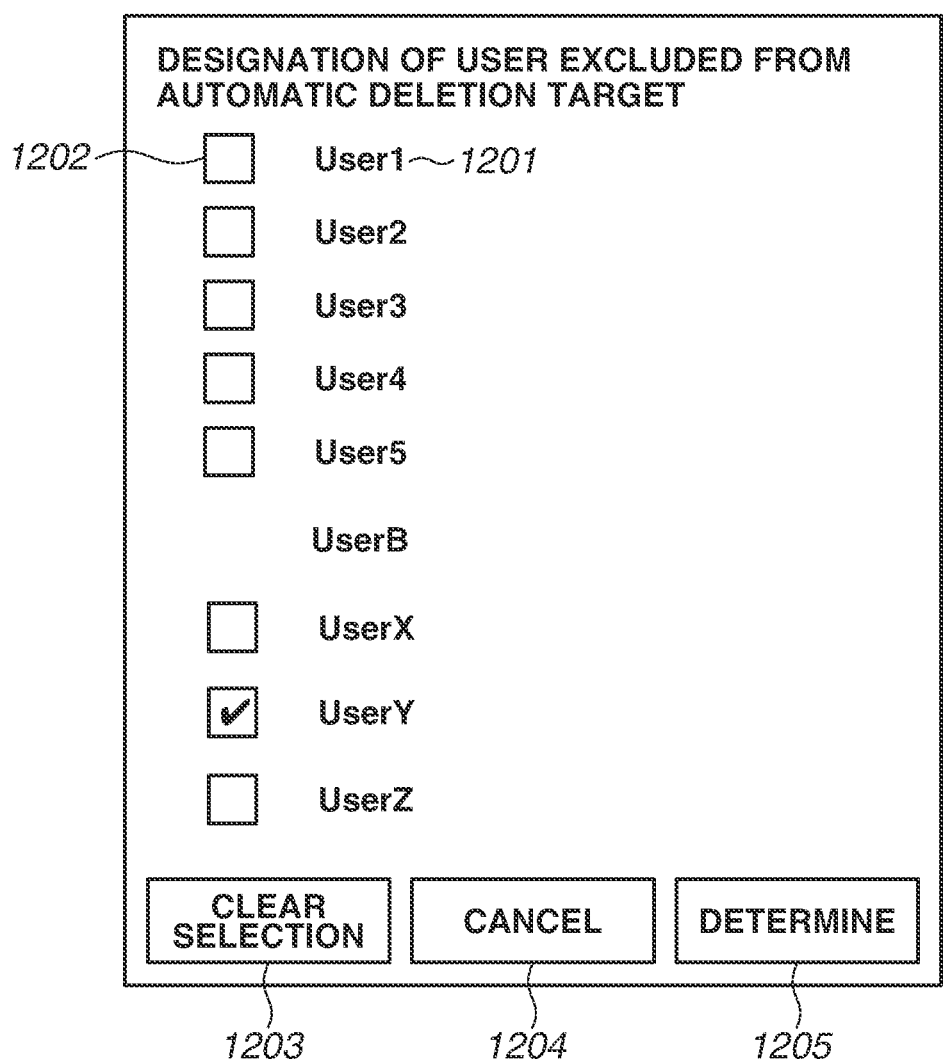
FIG. 12 illustrates a screen example of designation of a user excluded from an automatic deletion target of an MFP.

FIG. 12 illustrates an example of a screen for designating a user to be excluded from an automatic deletion target. On the screen illustrated in FIG. 12, a user list 1201 of users whose personal setting information is registered in the MFP 102 is displayed, and checkboxes 1202 for designating a user to be excluded from an automatic deletion target are provided. A selection clear button 1203 is a button for unchecking the selected checkboxes 1202, and a cancel button 1204 is used for cancelling the selection of a user to be excluded from an automatic deletion target. A determination button 1205 is used for determining a user to be excluded from an automatic deletion target.

In the example illustrated in FIG. 12, the user Y is designated to be excluded from the automatic deletion target. As described in the first exemplary embodiment, if the personal setting migration data 600 is imported into the MFP 102, because the last usage time and date of the user Y are old, the personal setting information of the user Y is deleted. In the present exemplary embodiment, because the user Y is designated to be excluded from the automatic deletion target, the personal setting information of the user Y is not automatically deleted. In the example illustrated in FIG. 12, a checkbox of the user B is hidden. This is because the user B is prevented from being selected as a deletion target because personal setting information of a user having the same user identifier as the user identifier 601 included in the personal setting migration data 600 is replaced by the import.

Figure 13B:
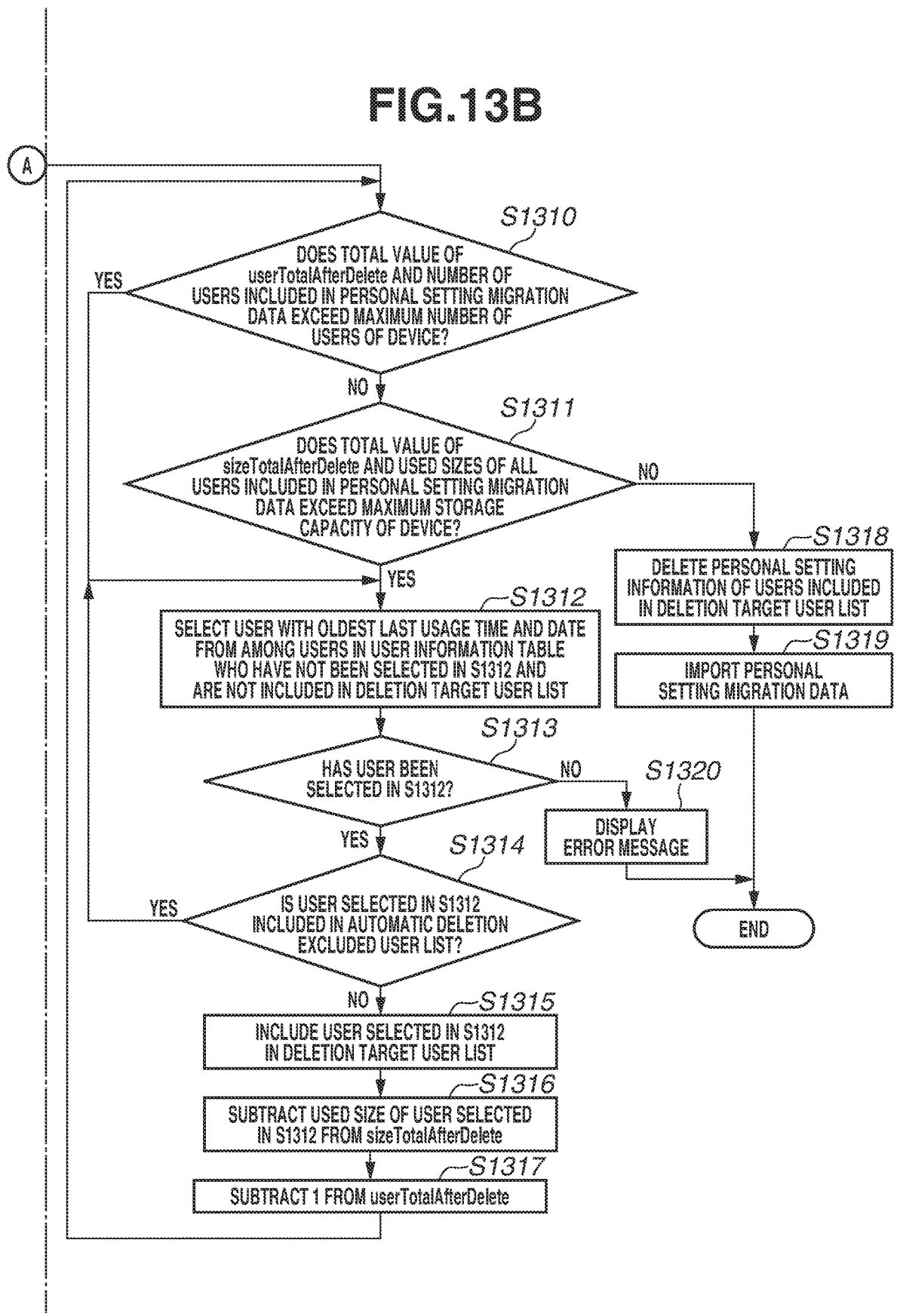

Next, the processing will be described with reference to a flowchart in FIGS. 13A and 13B. This flow is executed by the CPU 111 controlling a program stored in the ROM 113.

In step S1301, the CPU 111 displays the screen illustrated in FIG. 12, and sets a user selected by an administrator to be excluded from an automatic deletion target, in a deletion excluded user list. The user included in the deletion excluded user list is a user whose personal setting information is not automatically deleted in import processing even if last usage time and date are old, for example. In the deletion excluded user list, a list of user identifiers excluded from an automatic deletion target is described, which is not illustrated in the drawing. In addition, the deletion excluded user list is saved by the setting value storage control unit 203.

In step S1302, the CPU 111 acquires the used storage capacity in the setting information management table 810, and substitutes the used storage capacity into sizeTotalAfterDelete. The sizeTotalAfterDelete represents a total size of personal setting information in the MFP after the execution of the automatic deletion.

In step S1303, the CPU 111 acquires the number of users with registered personal setting in the setting information management table 810, and substitutes the number of users with registered personal setting into userTotalAfterDelete. The userTotalAfterDelete represents the number of users having personal settings in the MFP after the execution of the automatic deletion.

In step S1304, the CPU 111 checks whether personal setting information of a user included in the personal setting migration data 600 to be imported exists in the MFP. Specifically, the CPU 111 checks the personal setting migration data 600, and checks whether the same user identifier as the user identifier 601 exists in the user information table 800. If the same user identifier exists (YES in step S1304), the processing proceeds to step S1305. If the same user identifier does not exist (NO in step S1304), the processing proceeds to step S1306.

In step S1305, the CPU 111 sets the user in the user information table 800 that has the same user identifier as the user identifier 601 in the personal setting migration data 600, in a preferential deletion user list. The user included in the preferential deletion user list is a user whose personal setting information is stored in the MFP, and is a user included in the personal setting migration data 600. Because personal setting information of the user included in the preferential deletion user list is to be imported, the personal setting information is preferentially set as a deletion target.

In step S1306, the CPU 111 sets the user included in the preferential deletion user list, in the deletion target user list. In step S1307, the CPU 111 calculates a total value of the used size of personal setting information in the MFP of the user included in the preferential deletion user list. Specifically, the CPU 111 acquires used sizes in the user information table 800 that correspond to the same user identifiers as user identifiers of users included in preferential deletion user list, and obtains a total value of the used sizes.

In step S1308, the CPU 111 subtracts the value calculated in step S1307 from sizeTotalAfterDelete. As a result, the value of sizeTotalAfterDelete becomes the used storage capacity of personal setting information in the MFP that excludes the size of personal setting information in the MFP of the same user as the user included in personal setting migration data. The size of personal setting information in the MFP accordingly becomes a size set considering that the personal setting information is replaced with personal setting information of the user included in the personal setting migration data due to the import.

In step S1309, the CPU 111 subtracts a value of the number of users included in the preferential deletion user list, from the userTotalAfterDelete. As a result, the value of userTotalAfterDelete becomes the number of users with registered personal setting in the MFP that excludes the same user in the MFP as the user included in the personal setting migration data.

In step S1310, the CPU 111 checks whether a total value of the userTotalAfterDelete and the number of users included in the personal setting migration data exceeds the maximum number of users 701 in the upper limit management table 700. The CPU 111 thereby determines whether the number of users exceeds the maximum number of users as the result of importing the personal setting migration data 600. If it is determined that the number of users exceeds the maximum number of users (YES in step S1310), the processing proceeds to step S1312. If it is determined that the number of users does not exceed the maximum number of users (NO in step S1310), the processing proceeds to step S1311.

In step S1311, the CPU 111 determines whether a sum of the total used sizes of all the users included in the personal setting migration data 600 and sizeTotalAfterDelete exceeds the maximum storage capacity of the MFP. If it is determined that the sum exceeds the maximum storage capacity 702 (YES in step S1311), the processing proceeds to step S1312. If it is determined that the sum does not exceed the maximum storage capacity 702 (NO in step S1311), the number of users and the storage capacity do not exceed the values in the upper limit management table 700 even if the import is performed. Thus, the processing proceeds to step S1318. In step S1318, the CPU 111 deletes personal setting information of all the users included in the deletion target user list. Then, in step S1319, processing of importing the personal setting migration data into the MFP is performed.

In step S1312, the CPU 111 selects a user with the oldest last usage time and date 801 from among users in the user information table 800 who has never been selected in the processing in step S1312, and are not included in the deletion target user list. In step S1313, the CPU 111 determines whether a user satisfying the condition has been selected in step S1312. If it is determined that the user has been selected (YES in step S1313), the processing proceeds to step S1314.

If a user satisfying the condition has not been selected in step S1312, even though all the user excluding the user excluded from the automatic deletion target are deleted, if the personal setting migration data 600 is imported, the number of users or the storage capacity exceeds the maximum number of users or the maximum storage capacity. If it is determined in step S1313 that the user has not been selected in step S1312 (NO in step S1313), the processing proceeds to step S1320. In step S1320, the CPU 111 displays an error message (not illustrated) indicating that the import cannot be performed, and the processing ends.

In step S1314, the CPU 111 checks whether the user selected in step S1312 is included in an automatic deletion excluded user list. If the selected user is included in the automatic deletion excluded user list (YES in step S1314), the processing returns to step S1312 because personal setting information of the corresponding user cannot be automatically deleted. If the selected user is not included in the automatic deletion excluded user list (NO in step S1314), the processing proceeds to step S1315.

In step S1315, the CPU 111 makes the user selected in step S1312 be included in the deletion target user list. In step S1316, the CPU 111 subtracts the used size of the user selected in step S1312, from sizeTotalAfterDelete. Specifically, the CPU 111 acquires the used size of the selected user identifier from the user information table 800, and subtracts that value from sizeTotalAfterDelete. In step S1317, the CPU 111 subtracts 1 from userTotalAfterDelete and the processing returns to step S1310.

According to the present exemplary embodiment, it becomes possible to perform automatic deletion at a time of import while excluding a predesignated user, so that it becomes possible to perform import while leaving personal setting information of a user desired by an administrator, in the MFP 102.

The description has been given of an example of excluding a user (the user B) included in the personal setting migration data 600, from a selection target, when a user to be excluded from an automatic deletion target is selected on the screen illustrated in FIG. 12, but the user included in the personal setting migration data 600 may be made selectable. If the user included in the personal setting migration data is selected, personal setting information existing in the MFP 102 may be left without importing personal setting information of the corresponding user that is included in the personal setting migration data. Alternatively, an administrator may be prompted to select whether to leave personal setting information existing in the MFP 102 without change, or replace the personal setting information with personal setting information included in personal setting migration data.

In addition, last usage time and date may be designated, and personal setting information of a user with last usage time and date newer than the designated time and date may be prevented from being automatically deleted. For example, on the screen illustrated in FIG. 12, not only a user but also time and date are designated, and a user with last usage time and date equal to or later than the designated time and date is set as a user to be excluded from an automatic deletion target. In this case, the processing can be performed by setting, in step S1301, a user with last usage time and date equal to or later than the time and date designated on the screen illustrated in FIG. 12, in the deletion excluded user list as well.

Furthermore, if the number of users set as an automatic deletion target exceeds a certain fixed number, whether to perform or stop import processing may be made selectable. In this case, the maximum number of users to be automatically deleted is preset. Then, after the processing in step S1315, it is checked whether the number of users included in the deletion target user list exceeds the predetermined fixed number. In this way, this operation can be implemented.

In each of the above-described exemplary embodiments, the description has been given of an example of deleting personal setting information in chronological order of last usage time and date of users, as a condition selecting personal setting information to be automatically deleted. Nevertheless, another condition may be used or a plurality of conditions may be combined.

Figure 16A:
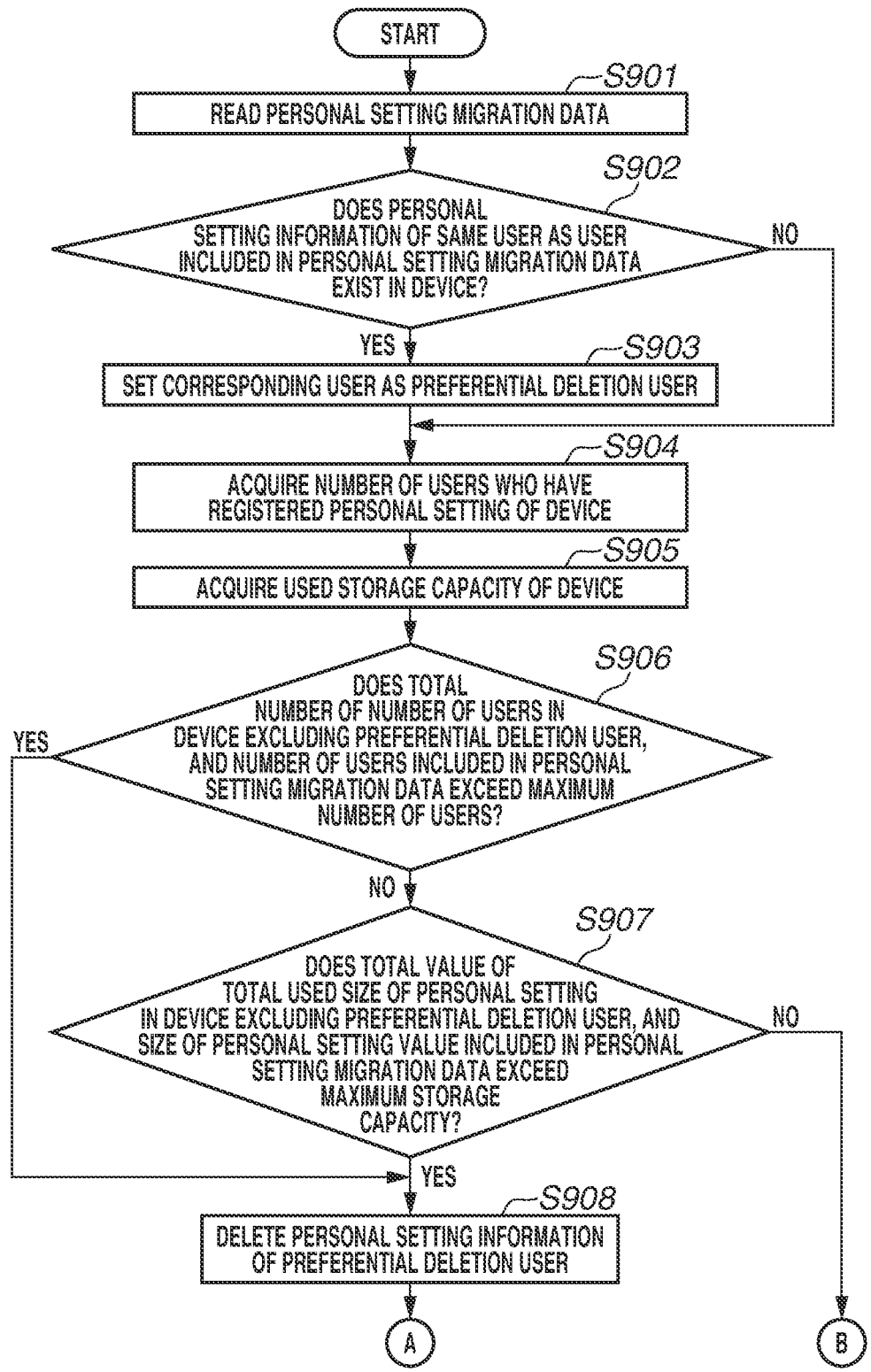
FIGS. 16A and 16B illustrate an example of a flowchart of import processing of personal setting information that involves a designatable automatic deletion condition of personal setting information of an MFP.
Figure 16B:
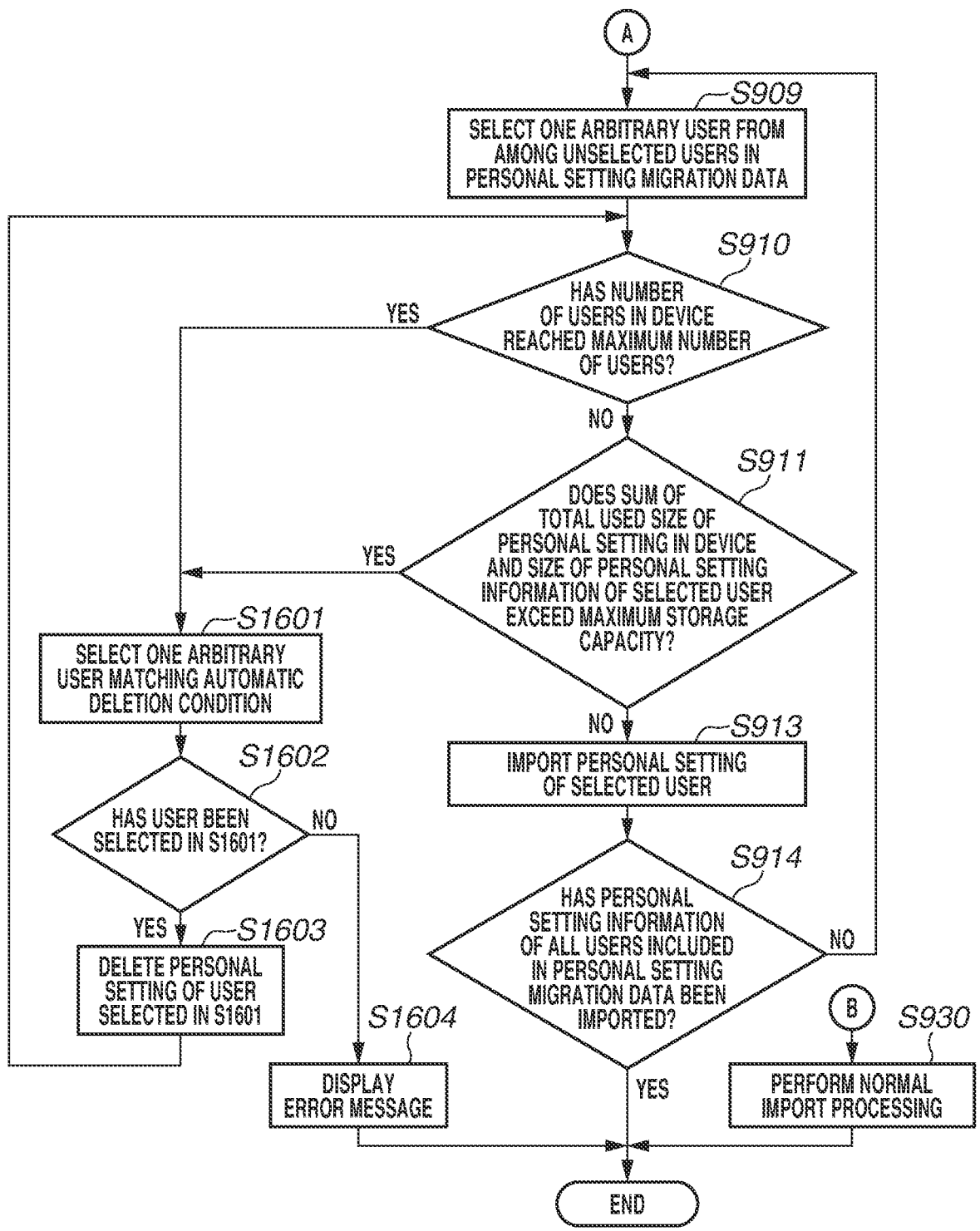

A fifth exemplary embodiment in which a condition for selecting a user to be automatically deleted is designated will be described with reference to an automatic deletion condition setting screen in FIG. 18 and a flowchart in FIGS. 16A and 16B. This flow is executed by the CPU 111 controlling a program stored in the ROM 113.

Figure 18:
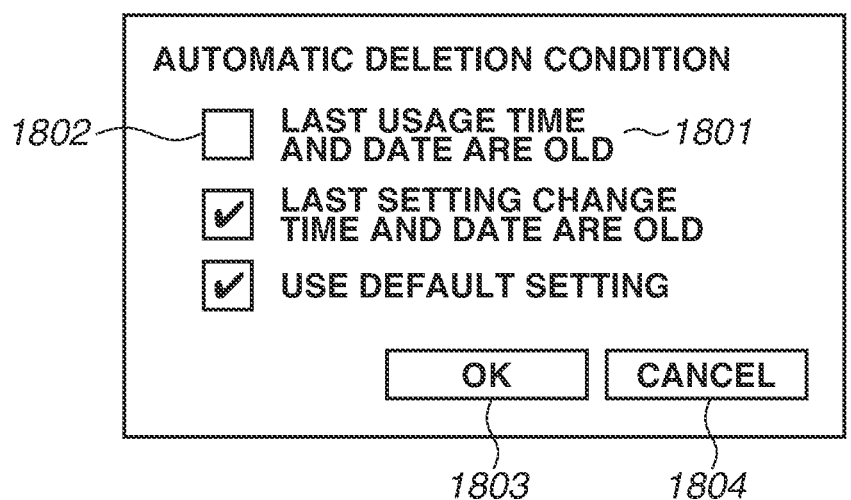
FIG. 18 illustrates an example of an automatic deletion condition setting screen of an MFP.

FIG. 18 illustrates an example of the automatic deletion condition setting screen, and illustrates a screen for setting a condition for selecting a target user, for automatically deleting personal setting information of an unnecessary user in importing personal setting information.

Conditions 1801 are conditions of automatic deletion. In FIG. 18, three conditions including "last login time and date are old", "last setting change time and date are old", and "use default setting" are displayed. The conditions are not limited to the three conditions, and another condition may be used. If the "last login time and date are old" is designated, a user with old login time and date is selected. If the "last setting change time and date are old" is designated, a user with old last change time and date of personal setting information is selected. If "use default setting" is designated, a user who uses the same setting as a device setting as a personal setting and has not changed the setting is selected.

Each of checkboxes 1802 is a checkbox for selecting whether to employ as a condition for searching for an automatic deletion target user. Conditions of the checked checkboxes 1802 are used when an automatic deletion target user is searched for. Only one condition may be made selectable or a plurality of conditions may be made selectable by checking the checkbox(es) 1802. If an OK button 1803 is pressed, conditions of the checked checkboxes 1802 are determined as automatic deletion conditions. If a cancel button 1804 is pressed, conditions of the checked checkboxes 1802 are cancelled. Each of the conditions 1801 may be made movable up and down, and a condition displayed in an upper part may be set as a condition to be prioritized when an automatic deletion target user is selected, for example.

Before importing personal setting information, an administrator sets a condition for selecting a user to be deleted if automatic deletion of personal setting information is performed, on the automatic deletion condition setting screen in FIG. 18. The screen illustrated in FIG. 18 is displayed by the display operation control unit 201. The screen may be displayed on the display 119 included in the MFP 101. Alternatively, for example, display data may be htmlized and the htmlized display data may be displayed on a browser of an external PC (not illustrated) via the communication I/F controller 117. In addition, the screen may be displayed via the communication I/F controller 117 on a dedicated application installed on the external PC.

Subsequently, the description will be given with reference to the flowchart in FIGS. 16A and 16B. The same processes as those in the flowchart in FIGS. 9A and 9B are assigned the same step numbers, and the redundant description will be omitted.

If it is determined in step S910 that the number of users with registered personal setting 721 has reached the maximum number of users 701 (YES in step S910) or if it is determined in step S911 that the total value exceeds the maximum storage capacity 702 (YES in step S911), the processing proceeds to step S1601. In step S1601, the CPU 111 selects arbitrary one user matching an automatic deletion condition preset by an administrator on the screen illustrated in FIG. 18. Specifically, the CPU 111 checks the user information table 800 and selects a user matching the automatic deletion condition. At this time, information necessary for searching for a user matching a condition is added to the user information table 800. For example, last change time and date of personal setting information and a flag indicating whether the setting has been changed from the default setting are added to the user information table 800. Instead of adding the information to the user information table 800, the CPU 111 may check personal setting information stored in the setting DB 400.

In step S1602, the CPU 111 checks whether the user matching the automatic deletion condition set on the screen illustrated in FIG. 18 has been selected. If the user has been selected (YES in step S1602), the processing proceeds to step S1603. If the user has not been selected (NO in step S1602), the processing proceeds to step S1604.

In step S1603, the CPU 111 deletes personal setting information of the user selected in step S1601, and the processing returns to step S910. In step S1604, because an automatic deletion target user has become unselectable before the completion of import, the CPU 111 displays an error message indicating that the import has not been able to be completed, and the processing ends.

According to the fifth exemplary embodiment, an administrator can preset a condition for selecting a user whose personal setting information is to be automatically deleted at a time of import.

Figure 17A:
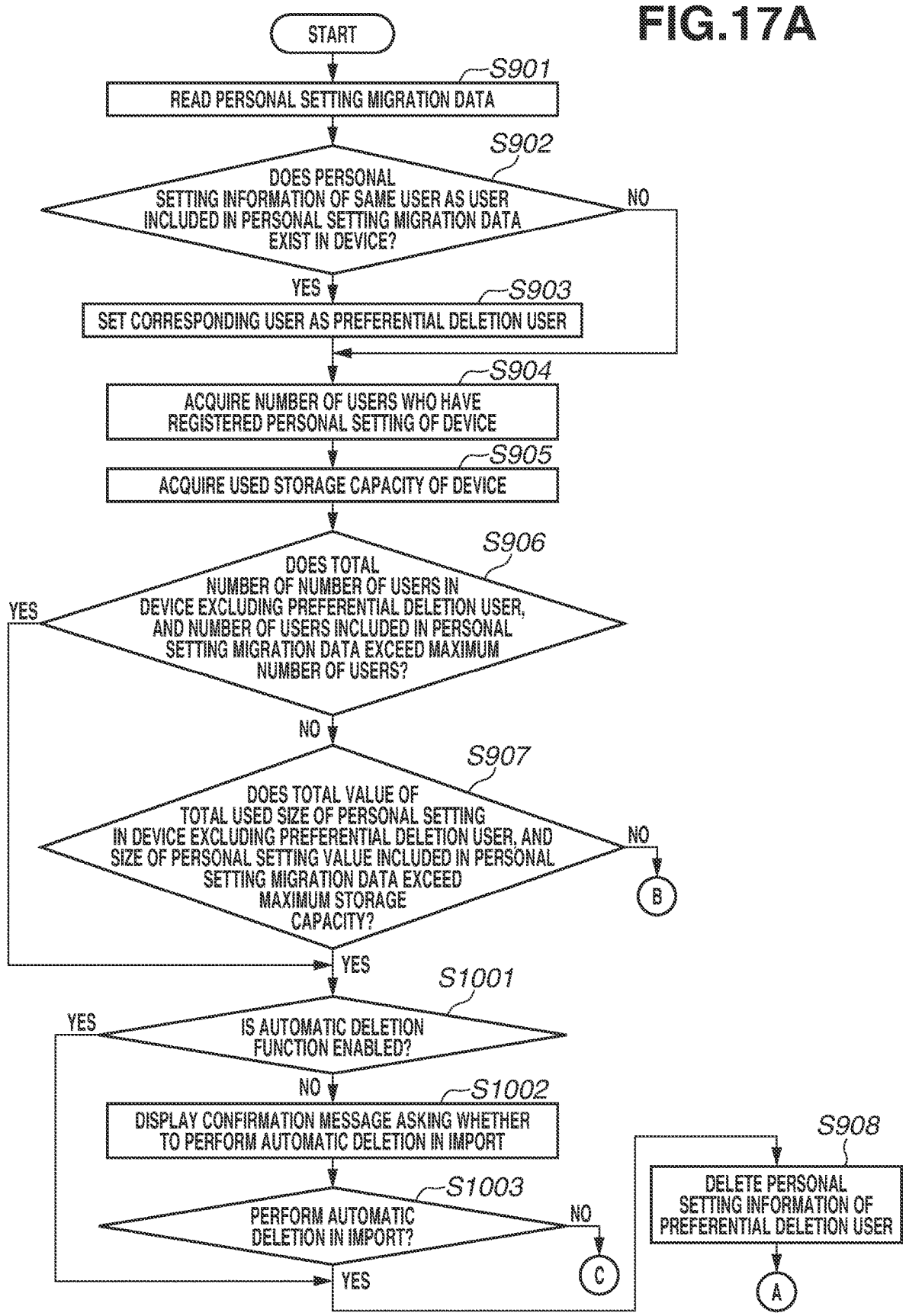

In a sixth exemplary embodiment, with reference to a flowchart in FIGS. 17A and 17B, the description will be given of an example of, if inexecution of automatic deletion of personal setting information is selected in the third exemplary embodiment, displaying a user list in an import destination MFP, and prompting a user to designate a deletion target user. The same processes as those in the flowchart in FIGS. 10A and 10B are assigned the same step numbers, and the redundant description will be omitted.

If it is determined that automatic deletion is not to be performed at a time of import (NO in step S1003), the processing proceeds to step S1701. In step S1701, the CPU 111 displays a deletion target user list screen for designating a deletion target user that is illustrated in FIG. 19A. FIG. 19A illustrates an example of the deletion target user designation screen for selecting a user to be deleted at a time of import. On the screen illustrated in FIG. 19A, a user list 1901 of users having personal setting information stored in the MFP 102 is displayed, and checkboxes 1902 for designating a user as a deletion target user are provided. A selection clear button 1903 is a button for unchecking the selected checkboxes 1902, and a cancel button 1904 is used for cancelling the selection of a deletion target user. A determination button 1905 is used for determining a deletion target user. In the example illustrated in FIG. 19A, the user 4, the user 5, and the user Z are designated as deletion target users. The user B cannot be selected because the user B is a user included in the personal setting migration data 600, but the user B is forcibly set as a deletion target.

In step S1702, the CPU 111 checks whether the total number of the number of users in the device excluding the deletion target user selected in step S1701, and the number of users included in the personal setting migration data exceeds the maximum number of users 701. If the total number exceeds the maximum number of users 701 (YES in step S1702), the processing proceeds to step S1704. If the total number does not exceed the maximum number of users 701 (NO in step S1702), the processing proceeds to step S1703.

In step S1703, the CPU 111 determines whether the total value of the total used size of personal setting information in the device excluding the deletion target user selected in step S1701, and the size of personal setting information included in the personal setting migration data 600 exceeds the maximum storage capacity. If the total value exceeds the maximum storage capacity (YES in step S1703), the processing proceeds to step S1704. If the total value does not exceed the maximum storage capacity (NO in step S1703), the processing proceeds to step S930. In step S930, the CPU 111 deletes personal setting information of the deletion target user selected in step S1701, and performs import processing of the personal setting migration data 600.

In step S1704, the CPU 111 displays a screen illustrated in FIG. 19B, and prompts a user to select whether to reselect a user whose personal setting information is to be deleted. If it is selected by the user in step S1705 that a user whose personal setting information is to be deleted is reselected (YES in step S1705), the processing returns to step S1701. If it is selected that a user whose personal setting information is to be deleted is not reselected (NO in step S1705), the processing ends because the import cannot be performed.

By performing the above-described processing, an administrator can designate a user to be deleted, if the administrator is prompted to select whether to perform automatic deletion of personal setting information at a time of import, and the inexecution of automatic deletion is selected.

The example of selecting a user to be deleted has been described with reference to the flowchart in FIGS. 17A and 17B, but personal setting information to be imported may be made selectable without importing all the personal setting information included in the personal setting migration data 600. More specifically, a user may be selected as an import target from among users included in the personal setting migration data 600 to be imported. As an example of a flowchart illustrating processing to be performed in this case, the processing in steps S1701 to S1705 is only required to be performed assuming that a user whose personal setting information is to be imported is selected. The processing will be described with reference to steps S1701' to S1705'.

In step S1701', a selection screen for selecting an import user to be imported is displayed as illustrated in FIG. 19C. Users 1911 are users included in the personal setting migration data 600, and checkboxes 1912 are checkboxes for designating whether to import personal setting information. A button 1913 is a button for collectively checking the checkboxes 1912 corresponding to all the users. A button 1914 is a button for unchecking all the selected checkboxes 1912. A button 1915 is a button for importing personal setting information of the users selected in the checkboxes 1912. In the example illustrated in FIG. 19C, the user A and the user C are selected as import target candidates of personal setting information. The screen illustrated in FIG. 19C is displayed by the display operation control unit 201. The screen may be displayed on the display 119 included in the MFP 101. Alternatively, for example, display data may be htmlized and the htmlized display data may be displayed on a browser of an external PC (not illustrated) via the communication OF controller 117. In addition, the screen may be displayed via the communication OF controller 117 on a dedicated application installed on the external PC.

In step S1702', it is determined whether the total number of the number of users in the device and the number of users selected in step S1701' exceeds the maximum number of users. At this time, if the users selected in step S1701' are included in the user information table 800, the number of corresponding users is subtracted from the number of users in the device. If it is determined in step S1702' that the total number exceeds the maximum number of users (YES in step S1702'), the processing proceeds to step S1704'. If it is determined in step S1702' that the total number does not exceed the maximum number of users (NO in step S1702'), the processing proceeds to step S1703'.

In step S1703', it is determined whether the total value of the total used size of personal setting information in the device and the sizes of personal setting information of the users selected in step S1701' exceeds the maximum storage capacity. At this time, if the users selected in step S1701' are included in the user information table 800, the sizes of personal setting information of the corresponding users are not added to the total size of personal setting information pieces in the device. If it is determined in step S1703' that the total value exceeds the maximum storage capacity (YES in step S1703), the processing proceeds to step S1704'. If it is determined in step S1703' that the total value does not exceed the maximum storage capacity (NO in step S1703), the processing proceeds to step S930.

In step S1704', a screen illustrated in FIG. 19D is displayed, and the user is prompted to select whether to reselect an import target user. In step S1705', it is determined whether to reselect an import target user. If reselection is selected on the screen illustrated in FIG. 19D (YES in step S1705'), the processing returns to step S1701'. If reselection is not selected (NO in step S1705'), the processing ends.

In the above description, steps S1701 to S1705 and steps S1701' to S1705' are separately described. Nevertheless, the both pieces of processing may be performed together, and the selection of a user whose personal setting is to be deleted, and the selection of a user whose personal setting is to be imported may be concurrently performed.

As described above, according to the present exemplary embodiment, by selecting a user whose personal setting information is desired to be deleted, or selecting a user whose personal setting information is desired to be imported, at a time of import, an administrator can freely control a user whose personal setting information is to be left without change.

Figure 20B:
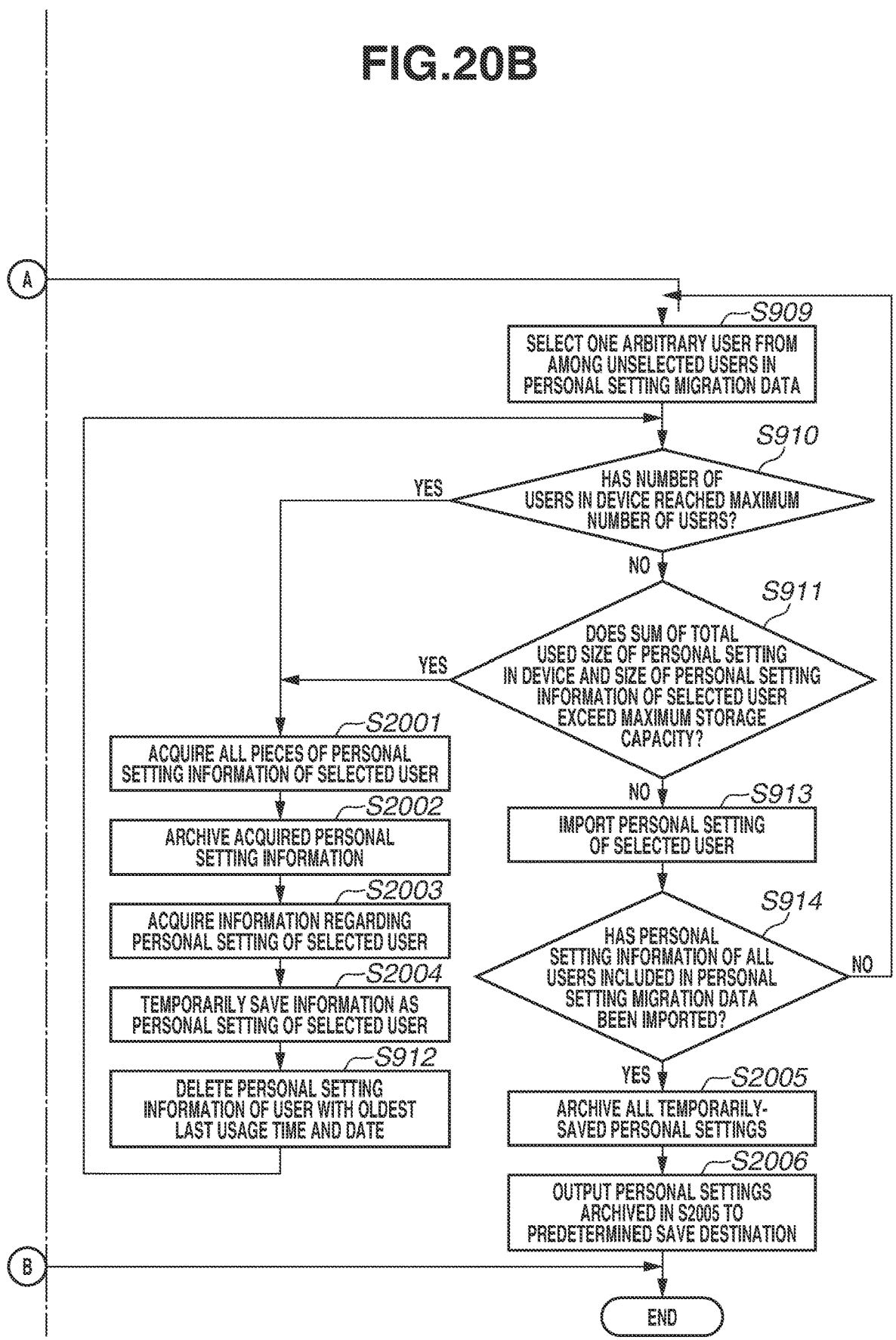

In each of the above-described exemplary embodiments, the description has been given of an example of automatically deleting personal setting information of an unnecessary user. In a seventh exemplary embodiment, an example of saving automatically-deleted personal setting information as backup data will be described with reference to a flowchart in FIGS. 20A and 20B. The same processes as those in the flowchart in FIGS. 9A and 9B are assigned the same step numbers, and the redundant description will be omitted.

If it is determined in step S910 that the number of users with registered personal setting 721 has reached the maximum number of users 701 (YES in step S910) or if it is determined in step S911 that the total value exceeds the maximum storage capacity 702 (YES in step S911), the processing proceeds to step S2001. In step S2001, the CPU 111 acquires all pieces of personal setting information of the user selected in step S909. Specifically, the CPU 111 reads all of data matching the user identifier of the user selected in step S909, from the setting DB 400.

In step S2002, the CPU 111 generates archive files of the personal setting information read in step S2001. At this time, an arbitrary archive format such as tar is used. In step S2003, the CPU 111 acquires information regarding the user selected in step S909. Specifically, the CPU 111 acquires a user identifier, a used size, and last usage time and date from the user information table 800. The information regarding the user is not limited to these, and other information may be acquired or part of the information may be acquired.

In step S2004, the CPU 111 temporarily saves personal setting information of the user selected in step S909. Specifically, the CPU 111 saves, into a temporary storage area (not illustrated), the archive files of the personal setting information that has been generated in step S2002, and the personal information acquired in step S2003. Then, the processing proceeds to step S912.

In addition, if it is determined in step S914 that personal setting information of all the users included in the personal setting migration data 600 has been imported (YES in step S914), the processing proceeds to step S2005.

In step S2005, the CPU 111 further archives the archive files of the user that have been temporarily saved in step S2004, and combines the archive files into one file as backup personal setting migration data. Specifically, the CPU 111 archives the archive files into one file using a format such as tar, and deletes the temporarily-saved personal setting information of the user that has been generated in step S2004.

In step S2006, the CPU 111 saves the backup personal setting migration data created in step S2005, into a save destination in a file server (not illustrated) predesignated by an administrator or a memory medium (not illustrated) such as a USB memory. The backup personal setting migration data can be used for import. Thus, by importing the backup personal setting migration data, automatically-deleted personal setting information of the user can be restored.

According to the present exemplary embodiment, even if personal setting information is automatically deleted at a time of import, the personal setting information can be restored as necessary because the deleted personal setting information is backed up.

According to each of the above-described exemplary embodiments, even if a problem such as capacity shortage in an import area occurs at a time of importing personal setting information, the import can be continued without bothering an administrator. Accordingly, the burden on the administrator can be reduced.

Other Exemplary Embodiments

In each of the above-described exemplary embodiments, the description has been given of an example in which upper limits are set on both of the number of users whose personal setting information can be registered, and the data size of registerable personal setting information, and control is performed so that the number of users and the data size do not exceed these upper limits due to the import. Alternatively, an upper limit may be set only on one of them. More specifically, an upper limit may be set only on the number of users whose personal setting information can be registered, or an upper limit may be set only on the data size of registerable personal setting information.

In addition, according to each of the above-described exemplary embodiments, import can be performed even in a case where the storage capacity exactly reaches the maximum storage capacity after the personal setting migration data 600 is imported. Nevertheless, in this case, when an MFP is to be used after the completion of import, personal setting information cannot be newly registered, which may be inconvenience. Thus, for example, in step S911, instead of making a comparison with the maximum storage capacity, a comparison may be made with a value obtained by adding a certain value to the maximum storage capacity. In this way, a save area has margin capacity corresponding to the certain value after personal setting information is imported. Thus, new personal setting information can be registered even immediately after import.

In the above-described exemplary embodiments, an image forming apparatus 100 having a plurality of functions such as a copy function and a scanner function has been described as an example, but the present disclosure can also be applied to an image processing apparatus having only a part of the functions. In addition, the present disclosure may be applied to another information processing apparatus such as a personal computer, a personal digital assistance (PDA), a mobile phone, a fax, a camera, a video camera, or another image viewer.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-234103, filed Dec. 14, 2018, which is hereby incorporated by reference herein in its entirety.

What is claimed is:

1. An information processing apparatus comprising:
storage that stores first personal setting information of users who use the information processing apparatus, and last login time and date when each of the first users last logged in to the information processing apparatus;
at least one memory that stores a set of instructions; and
at least one processor that executes the set of instructions, the set of instructions, when executed, causing the information processing apparatus to perform operations comprising:
setting whether to permit automatic deletion of the first personal setting information stored in the storage;
receiving an import instruction of second personal setting information including at least personal settings for a second user;
determining whether total personal setting information to be stored in the storage exceeds a registration upper limit when import processing of the second personal setting information is executed;
identifying, in a case where it is determined that the total setting information to be stored in the storage exceeds the registration upper limit when the import processing of the second personal setting information is executed according to the import instruction and in a case where it is set that the automatic deletion of the first personal setting information is permitted, at least one piece of the first personal setting information to be deleted, based on the last login time and date stored in the storage, and deleting the identified at least one piece of the first personal setting information stored so that the total personal setting information to be stored in storage does not exceed the registration upper limit after executing the import processing of the second personal setting information; and
performing control, in a case where it is determined that the total personal setting information to be stored in the storage exceeds the registration upper limit, and in a case where it is set that the automatic deletion of the first personal setting information is not permitted, to display information indicating that the import processing of the second personal setting information cannot be performed.

2. The information processing apparatus according to claim 1, the operations further comprising:
registering the second user and updating the first personal setting information so that the personal settings for the second user are added to the first personal setting information using the second personal setting information, without deleting a piece of the first personal setting information stored in the storage, in a case where it is determined that the total personal setting information to be stored in the storage does not exceed the registration upper limit.

3. The information processing apparatus according to claim 1, wherein the personal setting information includes a setting item and a setting value of the setting item.

4. The information processing apparatus according to claim 3, wherein the setting item includes at least one of a setting of language to be used by a user, a setting of regarding a screen to be displayed on a display device of the information processing apparatus when the user logged in to the information processing apparatus, and an address list to be used by the user as a communication destination.

5. The information processing apparatus according to claim 1, wherein the last login time and date are either time and date on which a user logged into the information processing apparatus last time, or time and date on which a user logged out from the information processing apparatus last time.

6. The information processing apparatus according to claim 1, further comprising:
   a printing device; and
   a scan device,
      wherein a user who logs into the information processing apparatus can use at least a copy function that uses the printing device and the scan device.

7. The information processing apparatus according to claim 1, wherein whether the total personal setting information to be stored in the storage exceeds the registration upper limit is determined based on a data size increasing in a case where the import processing of the second personal setting information is executed according to the import instruction, and a data size of a storage area for storing the first personal setting information.

8. The information processing apparatus according to claim 1, wherein a display object for an import target is displayed along with the information indicating that import cannot be performed.

9. The information processing apparatus according to claim 1, wherein the information indicating that import cannot be performed is displayed on a warning screen, and the warning screen includes a display object for receiving an operation of deleting at least one of personal setting information stored in the storage, and importing personal setting information included in the data.

10. The information processing apparatus according to claim 1, wherein the operations further comprises updating the first personal setting information, based on the second personal setting data, after deleting the identified at least one piece of the first personal setting information stored in the storage.

11. The information processing apparatus according to claim 1, wherein in a case where the first personal setting information in the storage includes personal settings for a specific user and the second personal setting information includes personal settings for the specific user, in response to the import processing being performed based on the second personal setting information, the personal settings for the specific user included in the first personal setting information in the storage is updated by using the personal settings for the specific user included in the second personal setting information.

12. A method for importing information regarding a user into an information processing apparatus, the information processing apparatus comprising storage that stores first personal setting information of users who use the information processing apparatus, and last login time and date when each of the first users last logged in to the information processing apparatus, the method comprising:
   setting whether to permit automatic deletion of the first personal setting information stored in the storage;
   receiving an import instruction of second personal setting information including at least personal settings for a second user;
   determining whether total personal setting information to be stored in the storage exceeds a registration upper limit when import processing of the second personal setting information is executed;
   identifying, in a case where it is determined that the total setting information to be stored in the storage exceeds the registration upper limit when the import processing of the second personal setting information is executed according to the import instruction and in a case where it is set that the automatic deletion of the first personal setting information is permitted, at least one piece of the first personal setting information to be deleted, based on the last login time and date stored in the storage, and deleting the identified at least one piece of the first personal setting information stored so that the total personal setting information to be stored in storage does not exceed the registration upper limit after executing the import processing of the second personal setting information; and
   performing control, in a case where it is determined that the total personal setting information to be stored in the storage exceeds the registration upper limit, and in a case where it is set that the automatic deletion of the first personal setting information is not permitted, to display information indicating that the import processing of the second personal setting information cannot be performed.

13. A non-transitory storage medium storing a program for causing a computer to execute a method for importing information regarding a user into an information processing apparatus, the information processing apparatus comprising storage that stores first personal setting information of users who use the information processing apparatus, and last login time and date when each of the first users last logged in to the information processing apparatus, the method comprising:
   setting whether to permit automatic deletion of the first personal setting information stored in the storage;
   receiving an import instruction of second personal setting information including at least personal settings for a second user;
   determining whether total personal setting information to be stored in the storage exceeds a registration upper limit when import processing of the second personal setting information is executed;
   identifying, in a case where it is determined that the total setting information to be stored in the storage exceeds the registration upper limit when the import processing of the second personal setting information is executed according to the import instruction and in a case where it is set that the automatic deletion of the first personal setting information is permitted, at least one piece of the first personal setting information to be deleted, based on the last login time and date stored in the storage, and deleting the identified at least one piece of the first personal setting information stored so that the total personal setting information to be stored in storage does not exceed the registration upper limit after executing the import processing of the second personal setting information; and
   performing control, in a case where it is determined that the total personal setting information to be stored in the storage exceeds the registration upper limit, and in a case where it is set that the automatic deletion of the first personal setting information is not permitted, to display information indicating that the import processing of the second personal setting information cannot be performed.

* * * * *